US010054286B2

(12) United States Patent
Brown et al.

(10) Patent No.: US 10,054,286 B2
(45) Date of Patent: Aug. 21, 2018

(54) OPTICAL TRANSFORMER, PROCESS FOR MAKING AND USE OF SAME

(71) Applicant: NATIONAL INSTITUTE OF STANDARDS AND TECHNOLOGY, Gaithersburg, MD (US)

(72) Inventors: Christopher M. Brown, Gaithersburg, MD (US); John T. Melcher, Gaithersburg, MD (US); Stephan J. Stranick, Gaithersburg, MD (US)

(73) Assignee: THE UNITED STATES OF AMERICA, AS REPRESENTED BY THE SECRETARY OF COMMERCE, THE NATIONAL INSITUTE OF STANDARDS AND TECHNOLOGY, Washington, DC (US)

( * ) Notice: Subject to any disclaimer, the term of this patent is extended or adjusted under 35 U.S.C. 154(b) by 489 days.

(21) Appl. No.: 14/792,184

(22) Filed: Jul. 6, 2015

(65) Prior Publication Data

US 2015/0323153 A1    Nov. 12, 2015

Related U.S. Application Data

(60) Provisional application No. 62/021,089, filed on Jul. 4, 2014.

(51) Int. Cl.
*G02B 6/32*    (2006.01)
*F21V 5/00*    (2018.01)
(Continued)

(52) U.S. Cl.
CPC ................ *F21V 5/008* (2013.01); *G02B 3/00* (2013.01); *G02B 6/0005* (2013.01);
(Continued)

(58) Field of Classification Search
None
See application file for complete search history.

(56) References Cited

U.S. PATENT DOCUMENTS

| 5,404,247 A | 4/1995 | Cobb et al. |
| 8,094,354 B2 | 1/2012 | Murayama |

(Continued)

FOREIGN PATENT DOCUMENTS

| EP | 0360233 B1 | 5/1994 |
| EP | 1081252 B1 | 1/2006 |
| EP | 1653266 A1 | 5/2006 |

OTHER PUBLICATIONS

E. J. Seibel et al., Unique Features of Optical Scanning, Single Fiber Endoscopy, Lasers in Surgery and Medicine, 2002, 177-183, vol. 30.

(Continued)

*Primary Examiner* — Sung Pak
(74) *Attorney, Agent, or Firm* — Office of Chief Counsel for National Institute of Standards and Technology

(57) ABSTRACT

An optical transformer includes: an optomechanical member configured: to receive incident light; and to produce primary light from the incident light including an initial propagation that includes a nonlinear scan; and a lens configured: to receive the primary light from the optomechanical member; to linearize the nonlinear scan; and to produce secondary light including a final propagation that comprises a linear scan, such that the optical transformer is configured to transform the nonlinear scan of the primary light to the linear scan of the secondary light. A process for optically transforming a nonlinear scan includes receiving an incident light by an optical transformer that includes an optomechanical member and a lens; producing a primary light from the incident light that includes an initial propagation having a nonlinear scan; communicating the primary light from to the (Continued)

lens; and producing a secondary light to optically transform the nonlinear scan, the secondary light including a final propagation that comprises a linear scan, based on optically linearizing the initial propagation.

20 Claims, 33 Drawing Sheets

(51) Int. Cl.
*F21V 8/00* (2006.01)
*G02B 3/00* (2006.01)
*G02B 26/10* (2006.01)

(52) U.S. Cl.
CPC ......... *G02B 26/101* (2013.01); *G02B 26/103* (2013.01); *G02B 26/105* (2013.01); *Y10T 29/49828* (2015.01)

(56) References Cited

U.S. PATENT DOCUMENTS

| | | | |
|---|---|---|---|
| 8,642,439 B2 | 2/2014 | Nian et al. | |
| 9,639,934 B2* | 5/2017 | Johnston | G06T 7/11 |
| 9,835,851 B2* | 12/2017 | Funakubo | G02B 26/101 |
| 2001/0055462 A1* | 12/2001 | Seibel | A61B 1/00048 |
| | | | 385/147 |
| 2002/0064341 A1* | 5/2002 | Fauver | G02B 6/241 |
| | | | 385/25 |
| 2006/0186325 A1* | 8/2006 | Johnston | G02B 6/262 |
| | | | 250/234 |
| 2006/0195014 A1* | 8/2006 | Seibel | A61B 1/0008 |
| | | | 600/102 |
| 2008/0058629 A1* | 3/2008 | Seibel | A61B 1/0008 |
| | | | 600/368 |
| 2010/0033792 A1* | 2/2010 | Shih | G02B 9/10 |
| | | | 359/206.1 |

OTHER PUBLICATIONS

H. C. Park et al., Lissajous fiber scanning for forward viewing optical endomicroscopy using asymmetric stiffness modulation, Optics Express, Mar. 10, 2014, 5818-5825, vol. 22, No. 5.

D. R. Rivera et al., Compact and flexible raster scanning multiphoton endoscope capable of imaging unstained tissue, Proceedings of the National Academy of Sciences, Oct. 25, 2011, 17598-17603, vol. 108, No. 43.

L. A. Kamentsky et al., Microscope-Based Multiparameter Laser Scanning Cytometer Yielding Data Comparable to Flow Cytometry Data, Cytometry, Mar. 8, 1991, 381-387, vol. 12.

R. H. Webb et al., Flying spot TV ophthalmoscope, Applied Optics, Sep. 1, 1980, 2991-2997, vol. 19, No. 17.

C. M. Brown et al., Optomechanical design and fabrication of resonant microscanners for a scanning fiber endoscope, Optical Engineering, Apr. 2006, 043001-043010, vol. 45(4).

D.R. Rivera et al., Use of a lensed fiber for a large-field-of-view, high-resolution, fiber-scanning microendoscope, Optics Letters, Mar. 1, 2012, 881-883, vol. 35, No. 5.

D.R. Rivera et al., Multifocal multiphonton enscope, Optics Letters, Apr. 15, 2012, 1349-1351, vol. 37, No. 8.

* cited by examiner

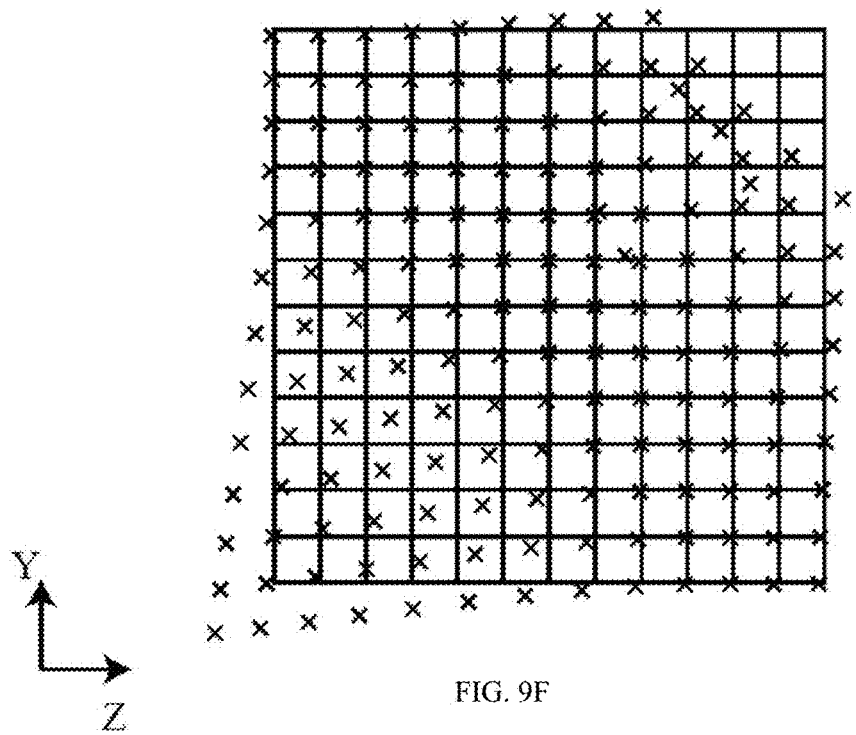
FIG. 9F
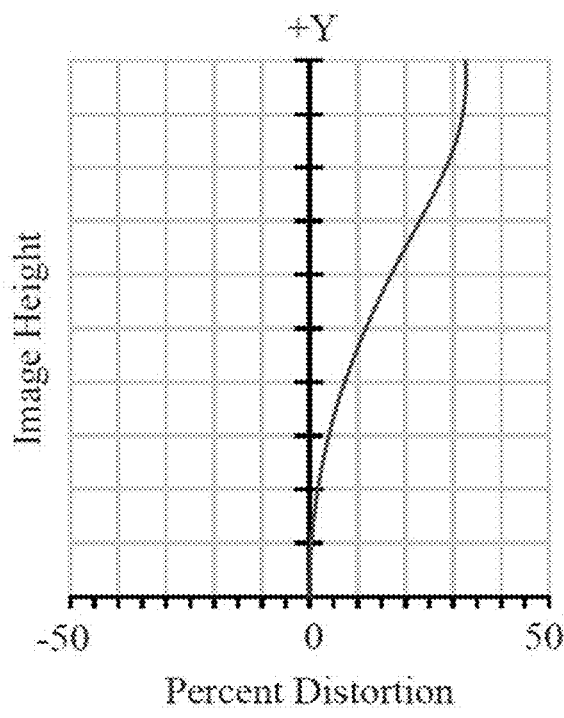
FIG. 9G
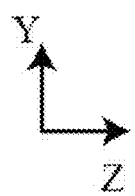

OPTICAL TRANSFORMER, PROCESS FOR MAKING AND USE OF SAME

CROSS REFERENCE TO RELATED APPLICATIONS

This application claims the benefit of U.S. Provisional Patent Application Ser. No. 62/021,089 filed Jul. 4, 2014, the disclosure of which is incorporated herein by reference in its entirety.

STATEMENT REGARDING FEDERALLY SPONSORED RESEARCH

This invention was made with United States government support from the National Institute of Standards and Technology. The government has certain rights in the invention.

BRIEF DESCRIPTION

Disclosed is an optical transformer comprising: an optomechanical member configured: to receive incident light; and to produce primary light from the incident light comprising an initial propagation that comprises a nonlinear scan; and a lens configured: to receive the primary light from the optomechanical member; to linearize the nonlinear scan; and to produce secondary light comprising a final propagation that comprises a linear scan, such that the optical transformer is configured to transform the nonlinear scan of the primary light to the linear scan of the secondary light Also disclosed is a process for making an optical transformer, the process comprising: providing an optomechanical member configured to provide a primary light that comprises an initial propagation that comprises a nonlinear scan; and disposing a lens proximate to and in optical communication with the optomechanical member to receive the primary light from the optomechanical member and to optically transform the primary light to a secondary light to produce the optical transformer, wherein the secondary light comprises a final propagation that comprises a linear scan, based on optical linearization of the initial propagation.

Further disclosed is a process for optically transforming a nonlinear scan, the process comprising: receiving an incident light by an optical transformer that comprises: an optomechanical member configured to receive the incident light; and a lens in optical communication with the optomechanical member; producing, by the optomechanical member, a primary light from the incident light, the primary light comprising an initial propagation that comprises a nonlinear scan; communicating the primary light from the optomechanical member to the lens; and producing, by the lens, a secondary light from the primary light to optically transform the nonlinear scan, the secondary light comprising a final propagation that comprises a linear scan, based on optically linearizing the initial propagation.

BRIEF DESCRIPTION OF THE DRAWINGS

The following descriptions should not be considered limiting in any way. With reference to the accompanying drawings, like elements are numbered alike.

FIG. 9F shows a distortion, by the lens shown in FIG. 9A of primary light to produce secondary light;
FIG. 9G shows a graph of image height versus percent distortion for the lens shown in FIG. 9A.

DETAILED DESCRIPTION

A detailed description of one or more embodiments is presented herein by way of exemplification and not limitation.

It has been discovered that an optical transformer including an optomechanical member to produce a primary light (e.g., having a bounded periodic motion (BPM) or a substantially periodic motion) and a lens to transform the primary light to a secondary light produces the secondary light with a selected scan that is substantially linear from a nonlinear scan of the primary light. The secondary light cumulatively, over time, substantially fills a field of view (FOV) uniformly. Advantageously, the secondary light can be a substantially linear scan. Accordingly, the optical transformer optically transforms the primary light having a nonlinear resonant scan to the secondary light having a linear scan to uniformly fill a selected FOV.

Figure 1:
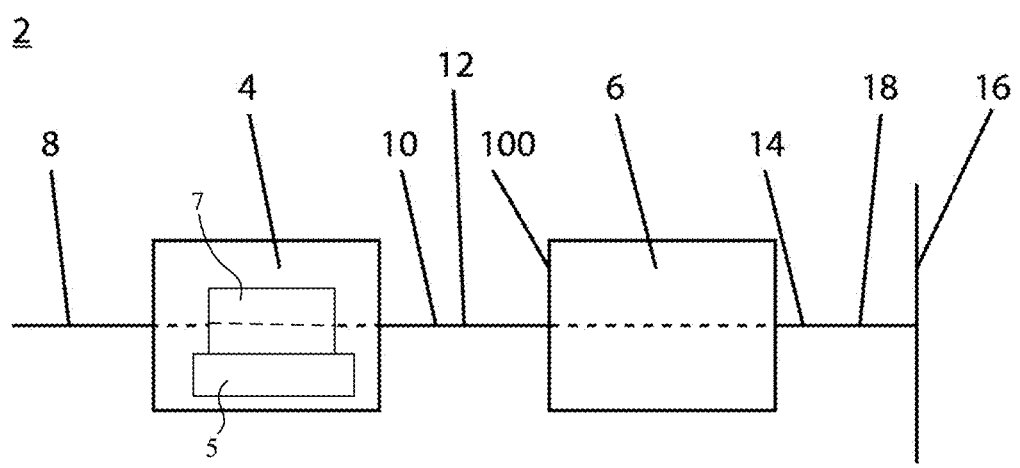
FIG. 1 shows an optical transformer.

In an embodiment, as shown in FIG. 1, optical transformer 2 includes optomechanical member 4 and lens 6. Optomechanical member 4 includes mechanical member 5 and optical member 7. Mechanical member 5 is configured to move in response to an actuation and to drive a motion of optical member 7. Optical member 7 includes, e.g., an optical fiber, waveguide, mirror, and the like. Optomechanical member 4 is configured to communicate light therethrough by, e.g., transmission, reflection, or a combination thereof. Incident light 8 is communicated by optomechanical member 4 to produce primary light 10 having initial propagation 12, which is, e.g., a BPM scan. Primary light 10 is communicated to lens 6. Lens 6 is configured to receive primary light 10 from optomechanical member 4 and to modify initial propagation 12 of primary light 10. As a result, lens 6 produces secondary light 14 such that sample space 16 is illuminated with secondary light 14 having final propagation 18. It is contemplated that, for initial propagation 12 that is a resonant nonlinear BPM scan, final propagation 18 is linear. Here, primary light 10 is incident on surface 100 of lens 6, which can have a selected shape (e.g., planar, curved, concave, convex, and the like) or can include an aperture.

Figure 2A:
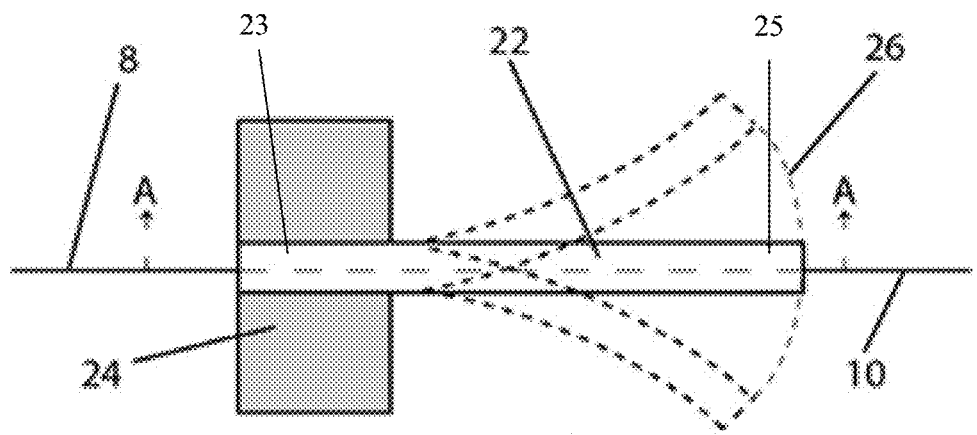
FIGS. 2A, 2B, and 2C show an optomechanical member.
Figure 2B:
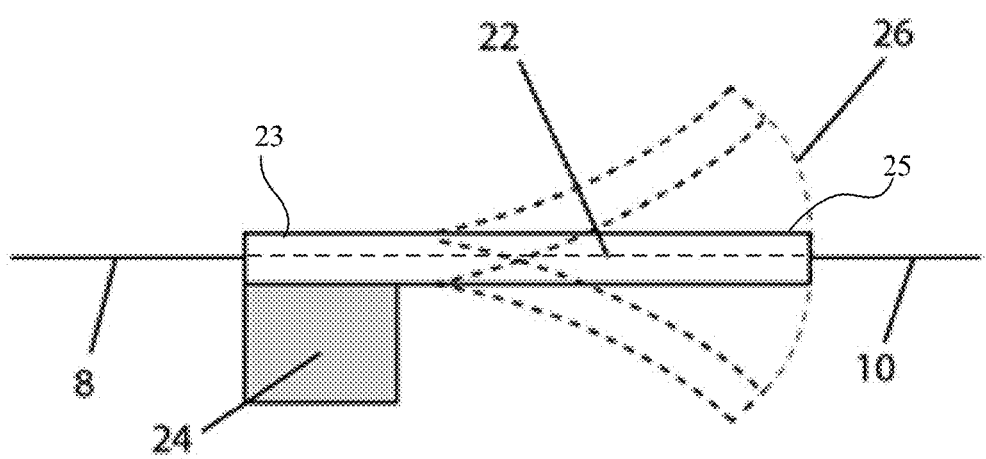
Figure 2C:
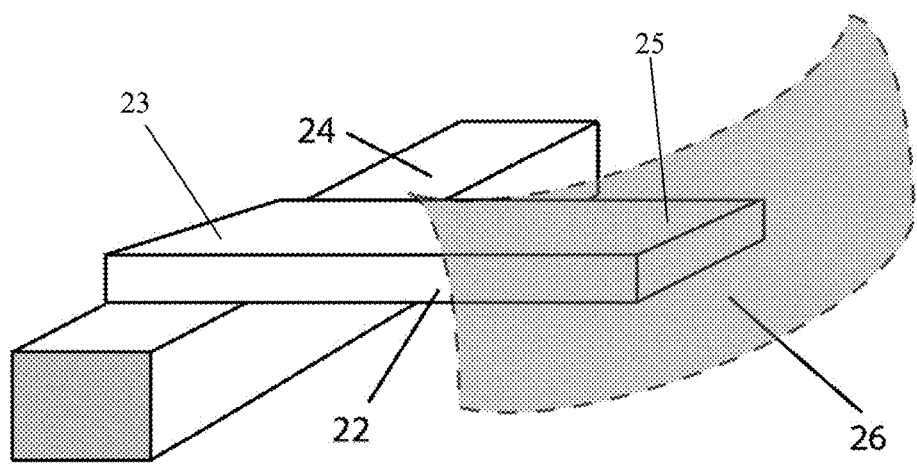

With reference to FIGS. 2A (top view of optomechanical member 4), 2B (cross section along line A-A of FIG. 2A), and 2C (perspective view of optomechanical member 4 of FIG. 2A), in an embodiment, optomechanical member 4 includes light guide 22 (an exemplary optical member 7) disposed on mount 24 (an exemplary mechanical member 5) to produces initial propagation 12, e.g., a two-dimensional BPM scan. Here, light guide 22 receives incident light 8 at first end 23 that is proximate to mount 24 and produces primary light 10 from incident light 8. First end 23 of light guide 22 has a fixed position relative to mount 24. Light guide 22 also includes second end 25 disposed distal to mount 24 and configured to move when subjected to a motional stimulus (such as an actuation) of first end 23 to produce displacement arc 26, which corresponds to, e.g., initial propagation 12 (i.e., the BPM scan) of primary light 10. A geometry (e.g., a length, width, height, connection of light guide 22 and mount 24, and the like) or material property (e.g., modulus of elasticity, density, and the like) of light guide 22 can be selected to control a path (e.g., a resonant frequency, frame rate, FOV, scan modality, or displacement of light guide 22) of initial propagation 12 of primary light 10.

Figure 3A:
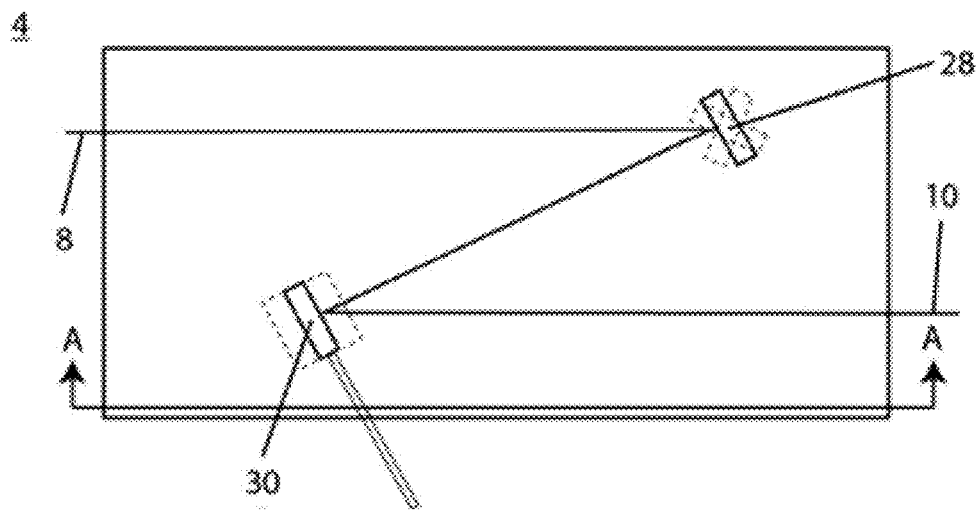
FIGS. 3A, 3B, and 3C show an optomechanical member.
Figure 3B:
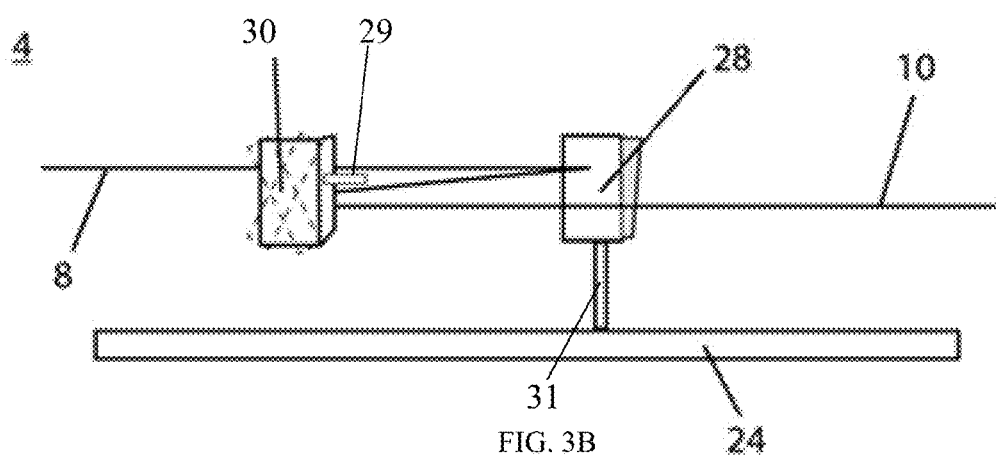
Figure 3C:
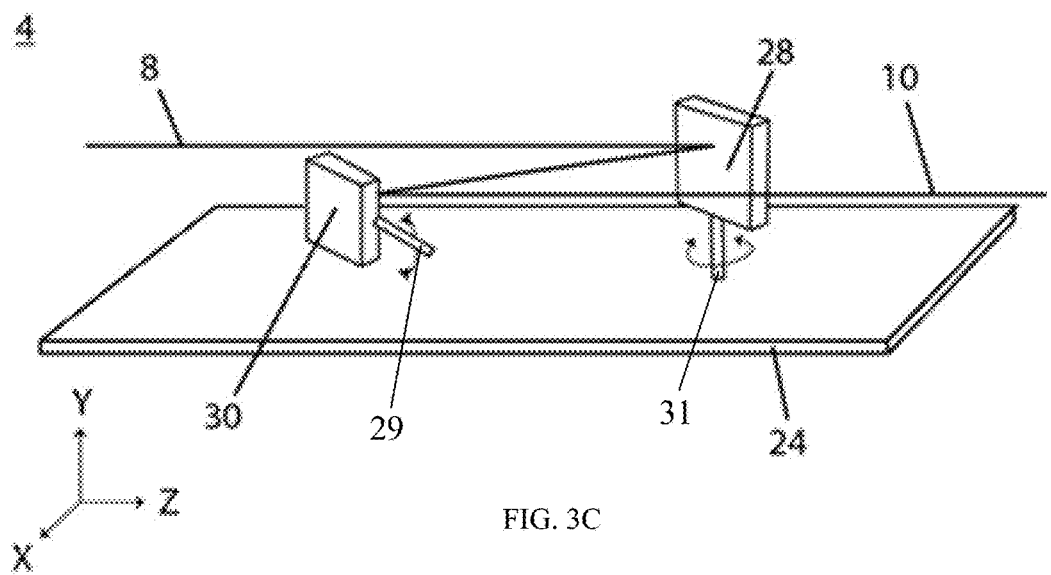

With reference to FIG. 3A (top view of optomechanical member 4), FIG. 3B (cross section along line A-A shown in FIG. 3A), and FIG. 3C (perspective view of optomechanical member 4 shown in FIG. 3A), in an embodiment, optomechanical member 4 produces primary light 10 having initial propagation 12 (e.g., the two-dimensional BPM scan). Here, optomechanical member 4 includes mirrors (28, 30) as optical member 7 disposed on mount 24. Mirror 28 reflects incident light 8 onto mirror 30 to produce primary light 10 that propagates from optomechanical member 4. Mirrors (28, 30) are configured to scan (e.g., rotate as indicated by motion about rotary member 29 and rotary member 31) orthogonally to each other to produce primary light 10 having initial propagation 12 that is the two-dimensional BPM scan.

Figure 4A:
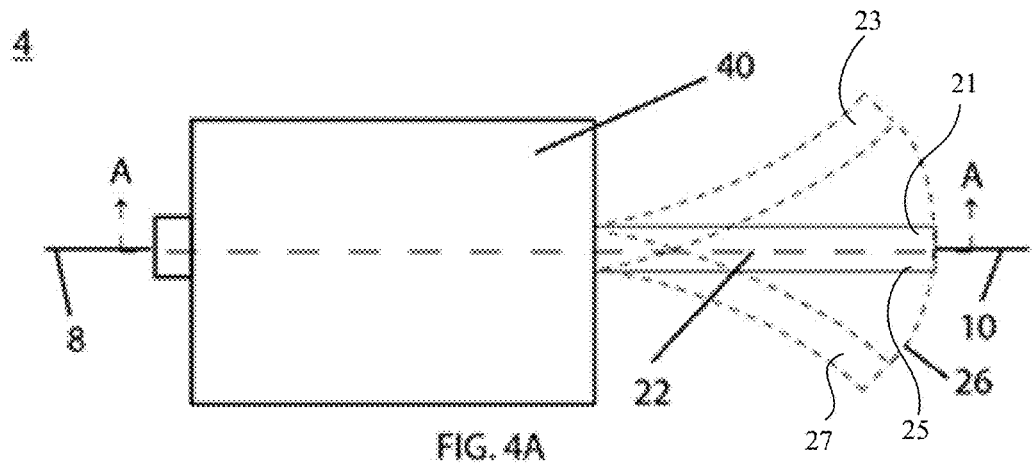
FIGS. 4A, 4B, and 4C show an optomechanical member.
Figure 4B:
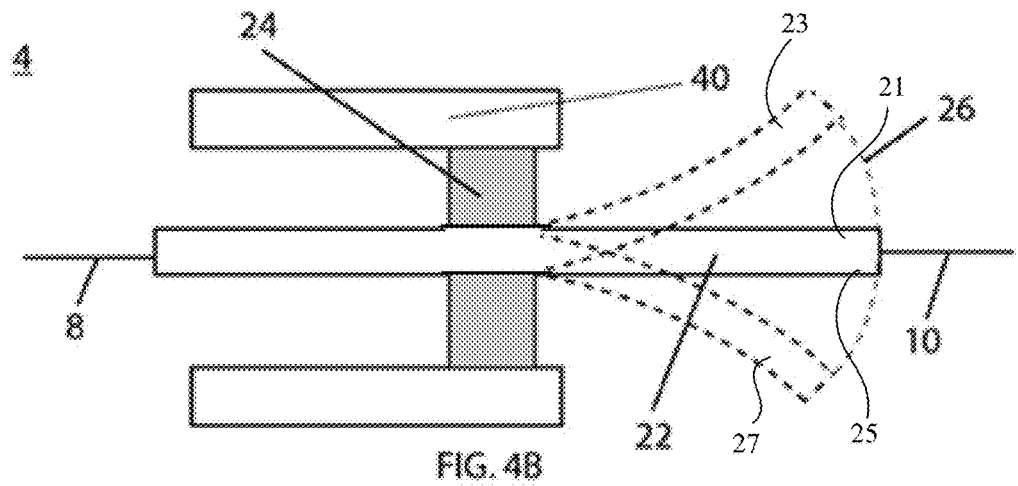
Figure 4C:
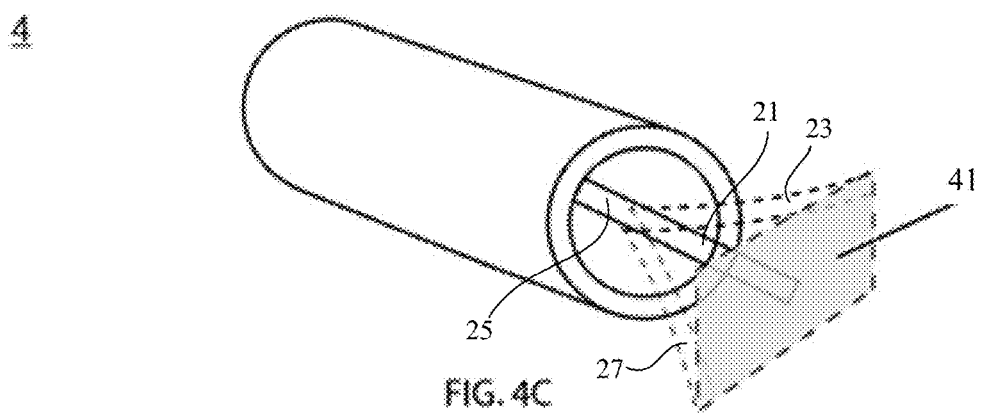

With reference to FIGS. 4A (top view of optomechanical member 4), 4B (cross section along line A-A shown in FIG. 4A), and 4C (perspective view of optomechanical member 4 shown in FIG. 4A), in an embodiment, light guide 22 of optomechanical member 4 produces displacement arc 26 in response to being subjected to actuation by actuator 40. Here, second end 25 of light guide 22 is configured to be at initial position 21 prior to actuation and then move between terminal positions (23, 27) when driven by actuator 40. In this configuration, actuator 40 produces initial propagation 12 (e.g., a two-dimensional BPM scan) of primary light 10 by actuating mount 24 on which light guide 22 is disposed. Incident light 8 is received by light guide 22 to produce primary light 10 that propagates from optomechanical member 4. According to an embodiment, actuator 40 is a piezoelectric cylinder that is configured to produce primary light 10 to illuminate FOV 41 having, e.g., the two-dimensional BPM scan from initial propagation 12. It is contemplated that optomechanical member 4 can be actuated in various ways, e.g., actuation in response to stimulus from a magnetic field, an electric coil, a MEMS thermal actuator, an electrostatic field, a piezoelectric article, a photonic force, and the like.

Figure 5A:
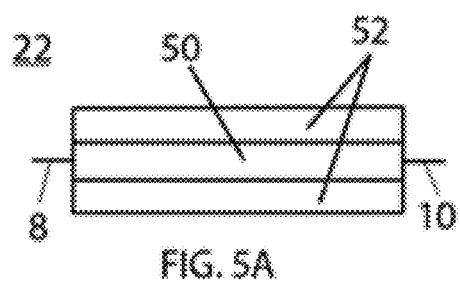
FIGS. 5A, 5B, 5C, 5D, and 5E show a light guide.
Figure 5D:
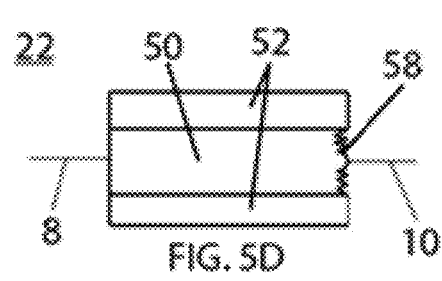
Figure 5B:
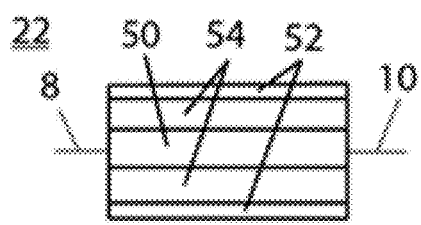
Figure 5E:
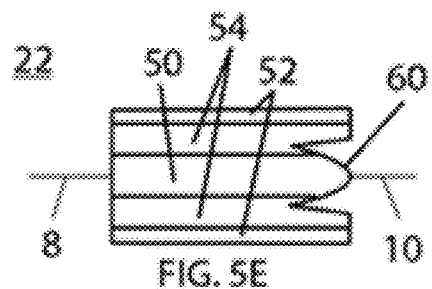
Figure 5C:
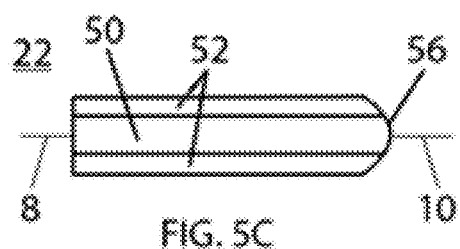

Light guide 22 can have a configuration effective to produce primary light 10 having initial propagation 12. In an embodiment shown in FIG. 5A, cladding 52 communicates light through region 50 to produce primary light 10 from incident light 8. In certain embodiments, as shown in FIG. 5B, cladding 54 communicates light through region 50 to produce primary light 10 from incident light 8 while cladding 52 communicates light through cladding 54 to collect scattered light or emitted light that is produced from incident light 8. In some embodiments, as shown in FIG. 5C, cladding 52 communicates light through region 50 to produce primary light 10 from incident light 8. Surface 56 has a shape to refract or focus primary light 10 to affect resolution of optical transformer 2, e.g., to increase resolution as compared with light guide 22 without a non-planar surface 56. In certain embodiments, as shown in FIG. 5D, cladding 52 communicates light through region 50 to produce primary light 10 from incident light 8. Here, surface 58 has a shape (e.g., ridged, curved, or a combination thereof) to diffract or focus primary light 10 to affect resolution of optical transformer 2. In one embodiment, as shown in FIG. 5E, cladding 54 communicates light through region 50 to produce primary light 10 from incident light 8. Here, cladding 52 communicates light through cladding 54 to collect scattered light or emitted light from incident light 8. Surface 60 has a shape to diffract or refract light or to focus primary light 10 to affect resolution of optical transformer 2. Cladding 52 and cladding 54 independently can be a material such as low index of refraction polymer or fluorine-doped silica. Region 50 can be a material such as silica.

Figure 6A:
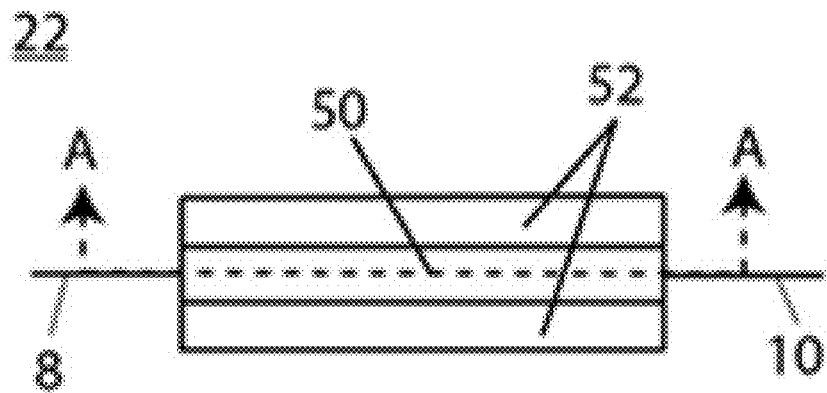
FIGS. 6A and 6B show a light guide.
Figure 6B:
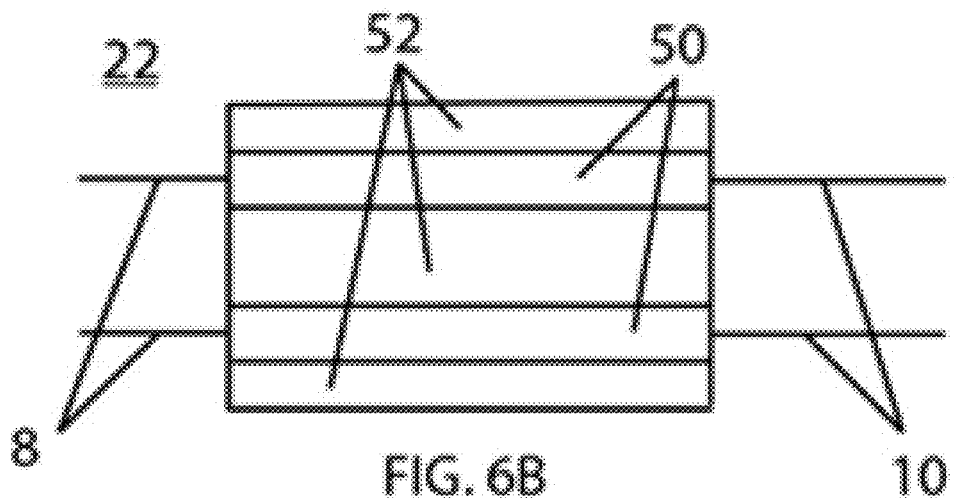

With reference to FIGS. 6A (side view light guide 22) and 6B (cross-section along line A-A shown in FIG. 6A), in an embodiment of light guide 22, cladding 52 communicates light through a plurality of regions 50 to multiplex production of primary light 10 from incident light 8. In this configuration, light guide 22 provides parallel illumination or collection of light such that optical transformer 2 has increased speed of imaging and transfer of information.

Without wishing to be bound by theory, it is believed that optomechanical member 4 that is configured to produce initial propagation 12 having the BPM scan for primary light 10 includes a resonant element (e.g., actuator 40) that has a motion described by formula 1

$$\ddot{x}(t)+2\zeta\omega\dot{x}(t)+\omega^2 x(t)=f\cos(\omega t) \quad (1)$$

where $\ddot{x}(t)$ is a second derivative of position x with respect to time t; $\dot{x}(t)$ is a first derivate of position x with respect to time t; ω is a resonant frequency; 0<ζ<<1 is a damping ratio; and f cos(ωt) is a harmonic excitation term that is tuned to resonance as described in Brown et al., Optical Engineering 45, 043001 (2006), the disclosure of which is incorporated by reference in its entirety. In an embodiment, certain values in formula 1 include ω=1 and f=2ζ so that a steady-state solution of formula 1 is provided by formula 2.

$$x(t)=\sin(t) \quad (2)$$

Formula 2 is periodic motion, e.g., a sinusoidal motion, of light guide 22 that produces initial propagation 12 having the BPM scan. The sinusoidal motion of primary light 10 having initial propagation 12 of the BPM scan is expanded in a series about t=0 in formula 3.

$$\sin t = t - \frac{t^3}{3!} + \frac{t^5}{5!} \quad (3)$$

Here, a first nonlinear term in the series expansion of formula 3 is cubic in time t.

Figure 7A:
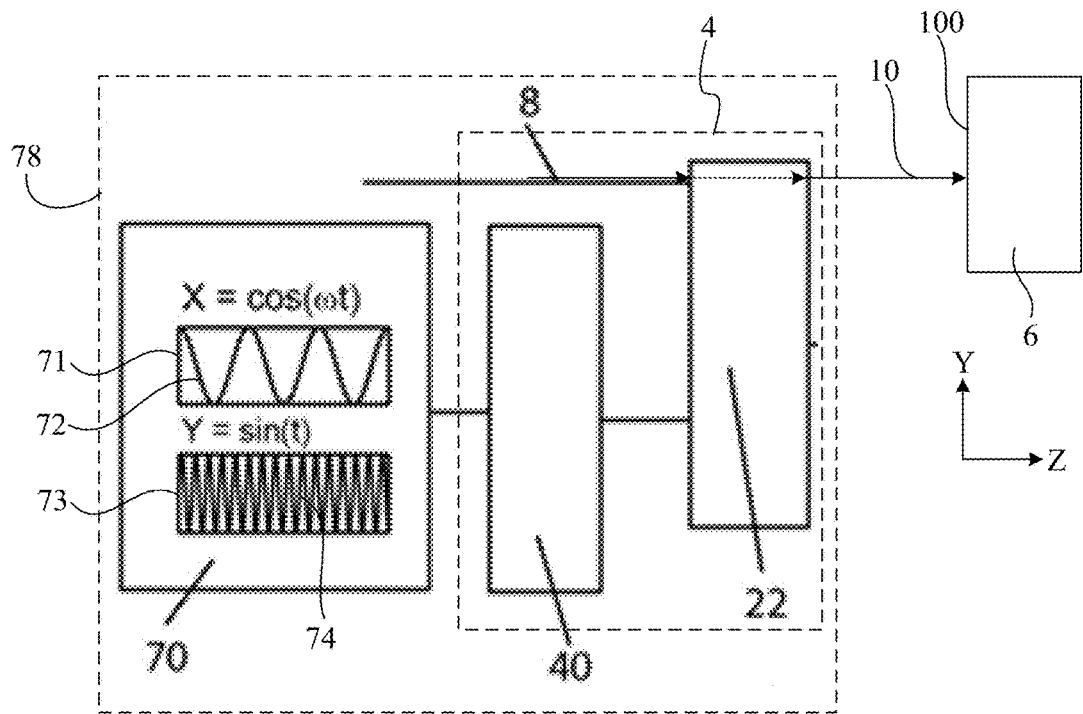
FIG. 7A shows a scan system and lens in optical communication.

In an embodiment, as shown in FIG. 7A, scan system 78 produces primary light 10 having initial propagation 12 (e.g., a BPM scan) incident on surface 100, which here is embodied as a planar surface of lens 6 with respect to an X-Y plane in FIG. 7A. Scan system 78 includes controller 70 in electrical communication with optomechanical member 4. Incident light 8 is received by light guide 22, which under motional control from actuator 40 produces primary light 10 that has a temporal progression and spatial progression on surface 100 given by initial propagation 12.

Controller 70 includes first signal source 71 and second signal source 73 that respectively provide first signal 72 and second signal 74 to actuator 40 to drive a motion of actuator 40 that produces an optomechanical scan (e.g., the BPM scan) of light guide 22. Actuator 40 receives first signal 72 as a control signal to control a position of primary light 10 in an X-direction with respect to the X-Y plane of surface 100 (see FIG. 7B), and actuator 40 also receives second signal 74 as a control signal to control a position of primary light 10 in a Y-direction with respect to surface 100. First signal 72 and second signal 74 are shown as selected waveforms on the left hand side of FIG. 7A.

Figure 7B:
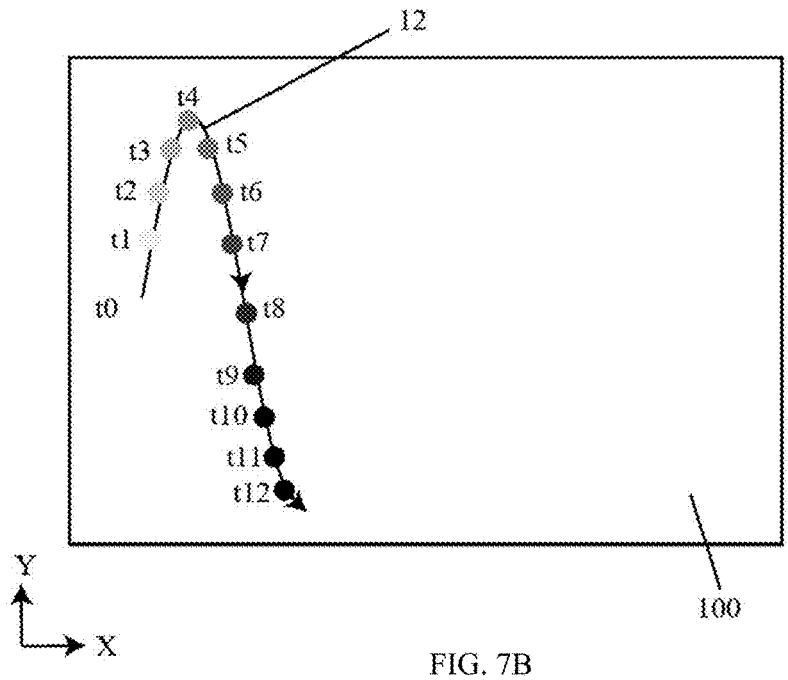
FIG. 7B shows an initial propagation of primary light on a surface of a the lens shown in FIG. 7A.

Due to the optomechanical scan of light guide 22, primary light 10 produced by light guide 22 has initial propagation 12 such that a location of primary light 10 incident at surface 100 varies spatially (i.e., in space, e.g., in an X-Y plane such as shown in FIG. 7B as an inset) and temporally (i.e., in time t0, t1, . . . , t12; where t1=t0+t, t2=t1+t, . . . , t12=t11+t). Further, discreet points (t0, t1, t2, t3, t4, t5, t6, t7, t8, t9, t10, t11, t12) for initial propagation 12 are shown on surface 100 in FIG. 7B. It should be appreciated that surface 100 can have a selected radius of curvature and can be nonplanar, but for purposes of describing initial propagation 12 of primary light 10 with respect to FIGS. 7A-7L and 8A, surface 100 is embodied as being planar.

Figure 7C:
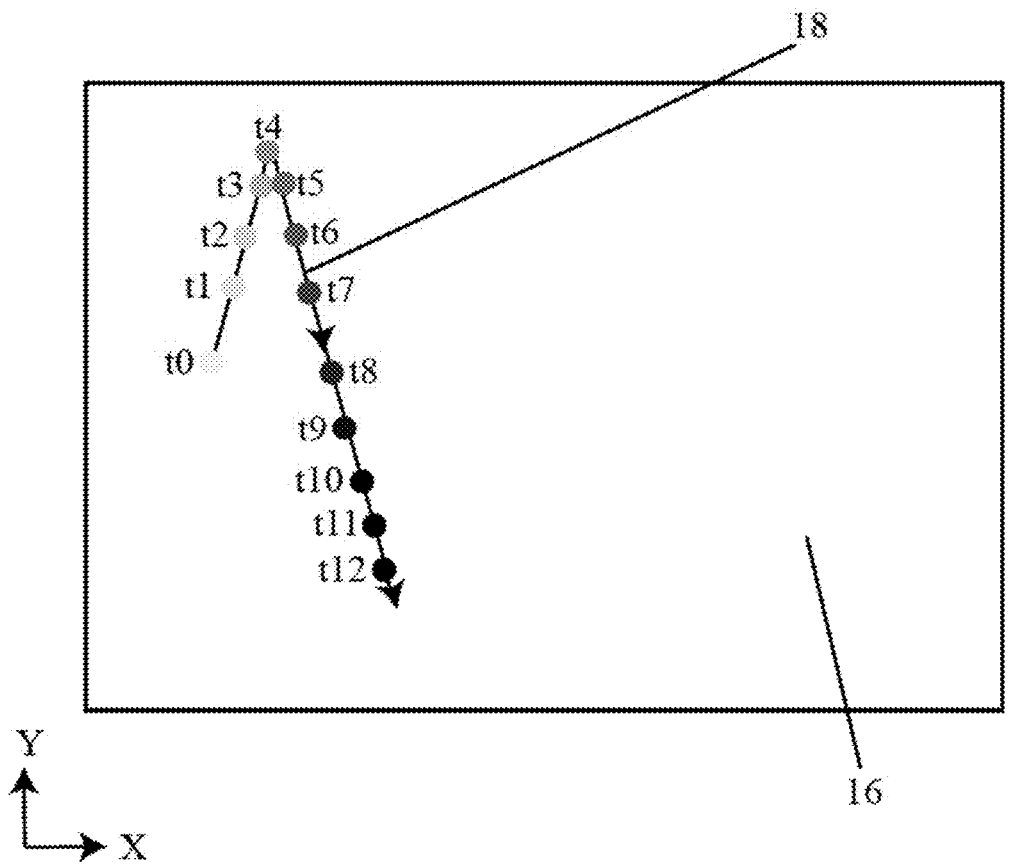
FIG. 7C shows a final propagation of secondary light from the lens shown in FIG. 7A onto a sample space.

An optical path of the initial propagation 12 that passes through optical transformer 2 is subjected to being linearized by lens 6 resulting in spatially linear (e.g., in an X-Y plane such as shown in FIG. 7C as an inset) and temporally (i.e., in time t0, t1, . . . , t12; where t1=t0+t, t2=t1+t, . . . , t12=t11+t) varying final propagation 18. Further, discreet points (t0, t1, t2, t3, t4, t5, t6, t7, t8, t9, t10, t11, t12) for final propagation 18 are shown on sample space 16 in FIG. 7C. It should be appreciated that sample space 16 can have a selected radius of curvature and can be nonplanar, but for purposes of describing final propagation 18 of primary light 14 with respect to FIGS. 7E, 7F, 7H, 7I, 7K, 7L-7L, 8B-8D, and 9A-9E, sample space 16 is embodied as being planar.

First signal 72 and second signal 74 can be selected to provide a selected initial propagation 12 at surface 100 of lens. Exemplary first signals 72 and second signals 74 are shown in FIGS. 7D, 7G, and 7J.

Figure 7D:
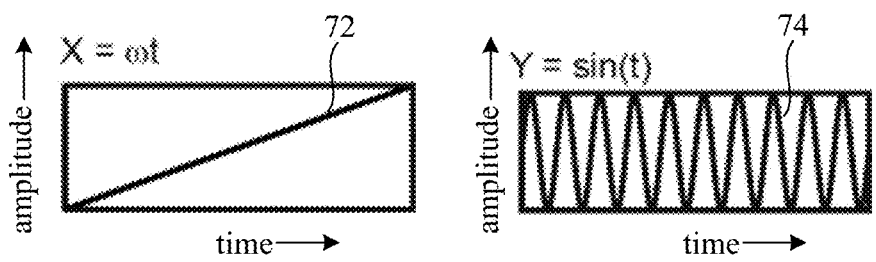
FIGS. 7D, 7G, and 7J show a first signal and second signal.
Figure 7E:
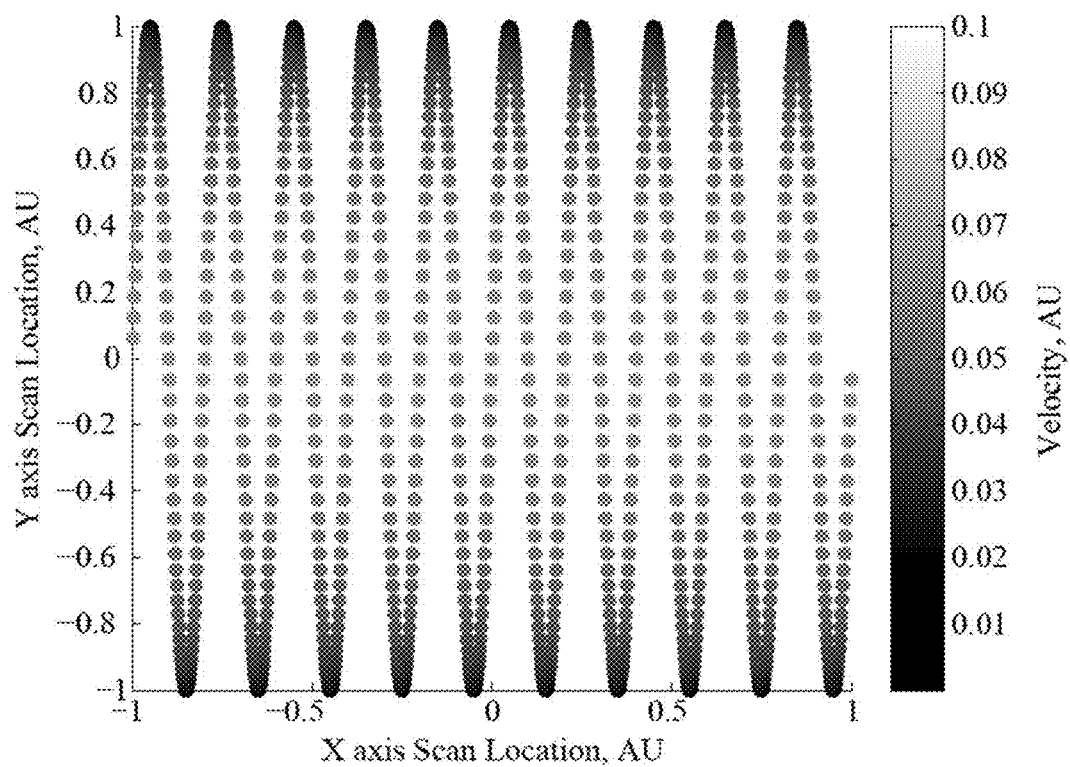
FIGS. 7E, 7H, and 7K show an initial propagation of primary light on an exemplary planar surface of the lens shown in FIG. 7A.
Figure 7F:
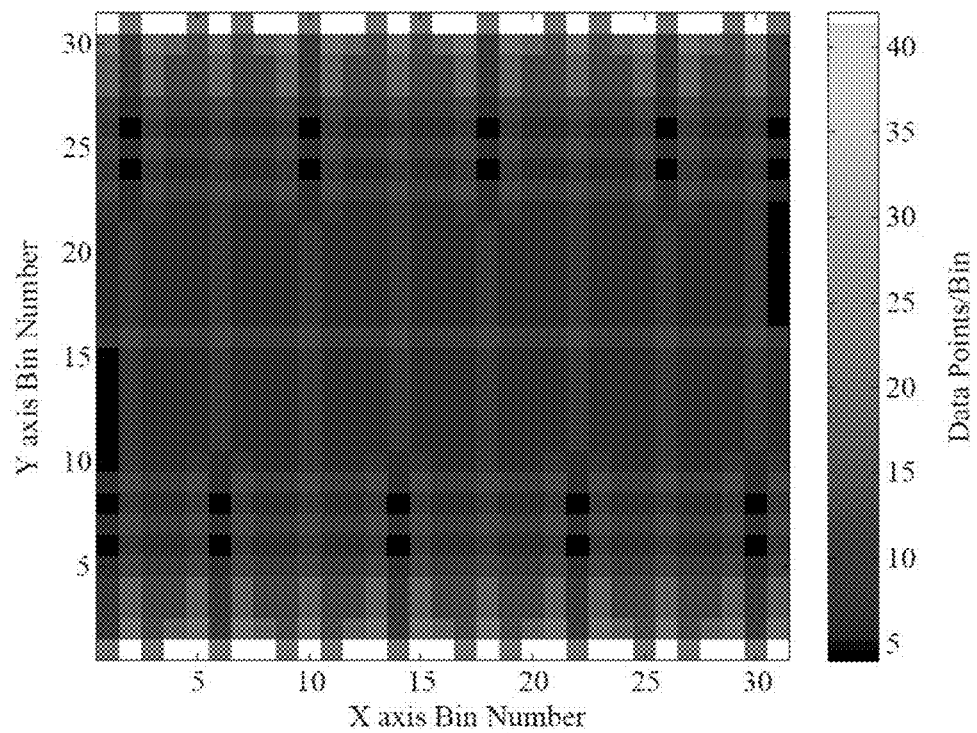
FIGS. 7F, 7I, and 7L show a spatial density map of primary light incident on an exemplary planar surface of the lens shown in FIG. 7A.
Figure 7G:
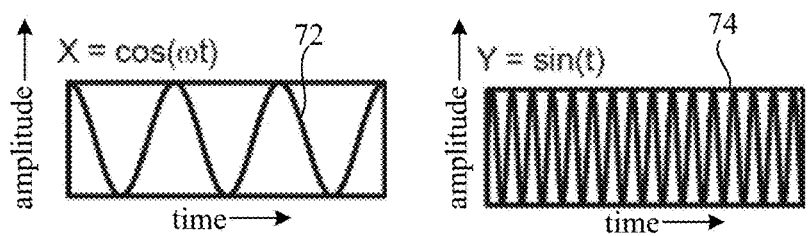
Figure 7H:
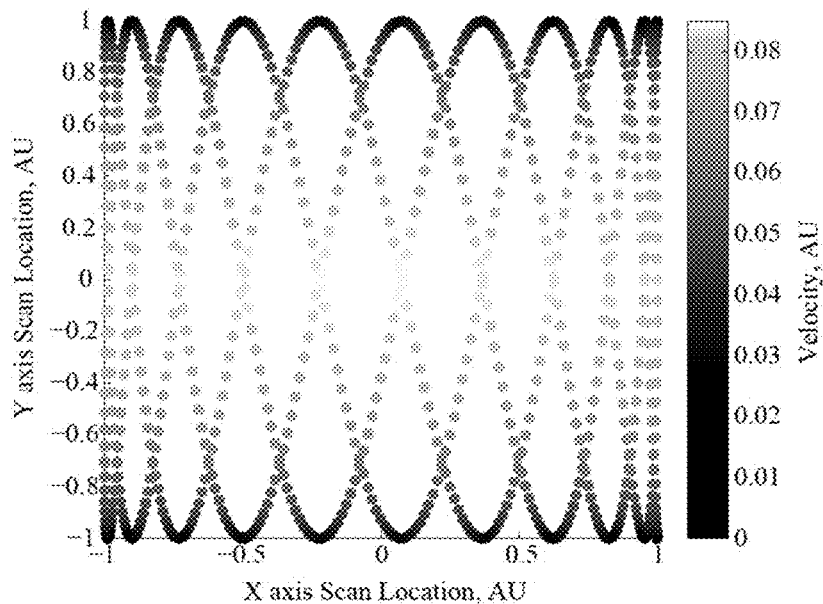
Figure 7I:
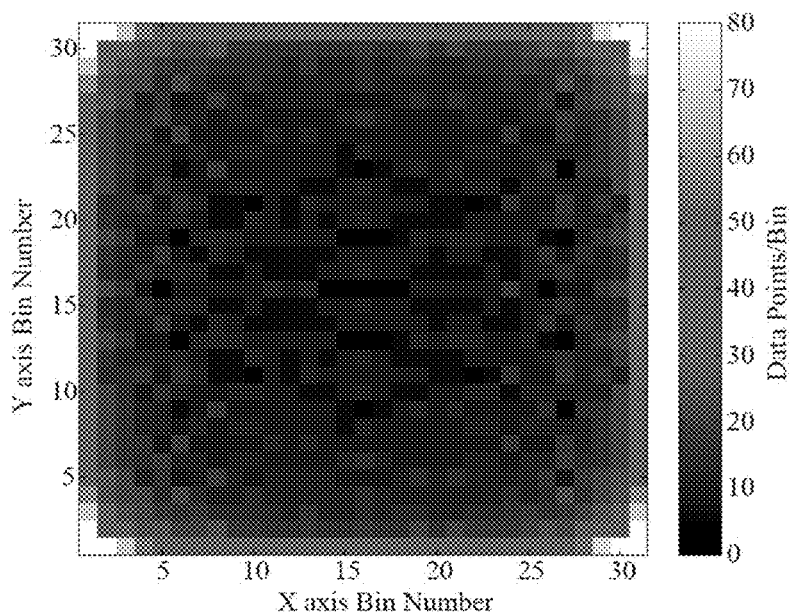
Figure 7J:
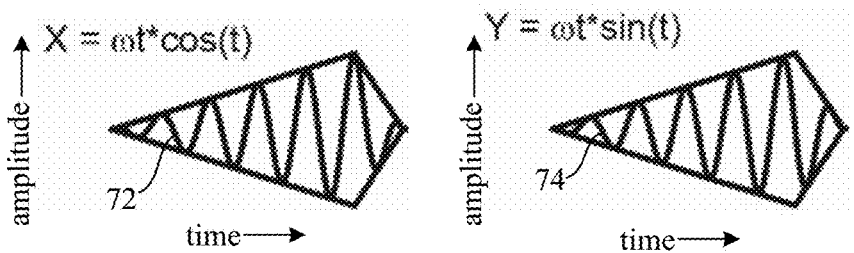
Figure 7K:
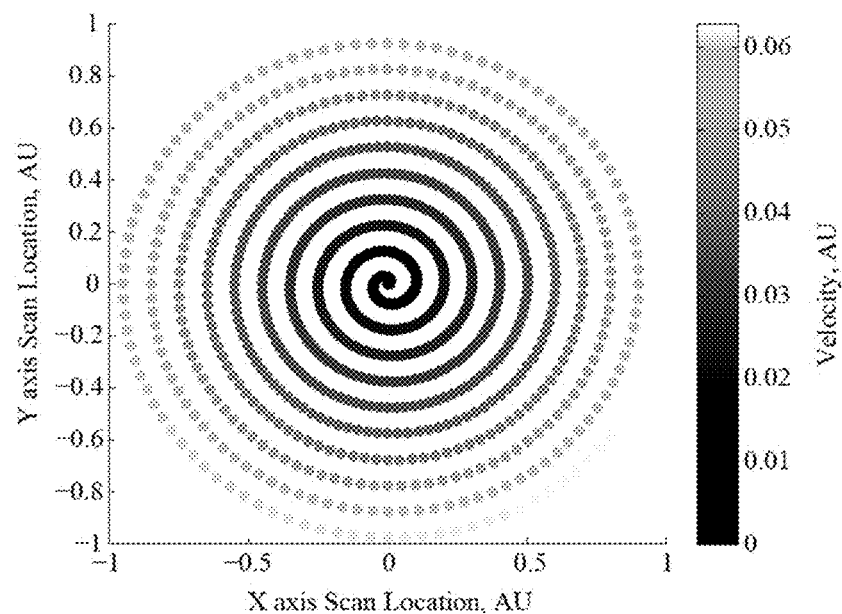

For initial propagation 12 of primary light 10 incident at surface 100 of lens 6, FIGS. 7E, 7H, and 7K (respectively for first signals 72 and second signals 74 shown in FIGS. 7D, 7G, and 7J) show a graph of Y axis scan location versus X axis scan location in the X-Y plane of surface 100 for a selected velocity indicated by a legend bar on a right hand side of FIGS. 7E, 7H, and 7K. Here, initial propagation 12 at surface 100 produces a pattern such as a mixed resonance pattern (FIG. 7E), Lissajous pattern (FIG. 7H), or spiral pattern (FIG. 7K). Although these three patterns are shown, initial propagation 12 can have any selected pattern determined by motion of actuator 40 provided by first signal 72 and second signal 74.

Figure 7L:
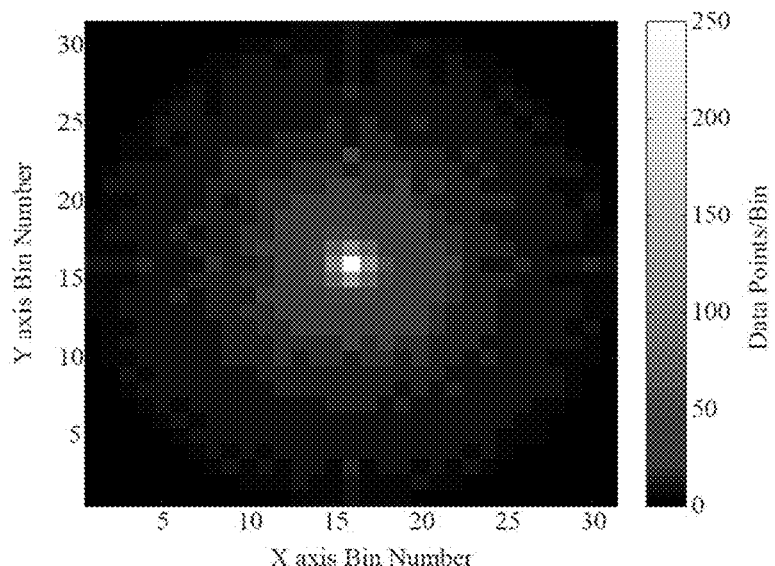

FIGS. 7F, 7I, and 7L show a graph of Y axis bin number versus X axis bin number for initial propagation 12 incident at surface 100 of lens 6 respectively for initial propagation 12 patterns shown in FIGS. 7E, 7H, and 7K. The graphs in FIGS. 7F, 7I, and 7L are spatial density maps 80 for a variation in a spatial density of uniform temporally sampled or displayed spots in initial propagation 12 across a FOV scanned by primary light 10 incident at surface 100 (which is embodied as being planar) and represented as a number of data points per bin for Y axis bin number versus X axis bin number. A legend bar located to a right hand side of FIGS. 7F, 7I, and 7L provides a relative density for X and Y axis positions on surface 100.

Figure 8A:
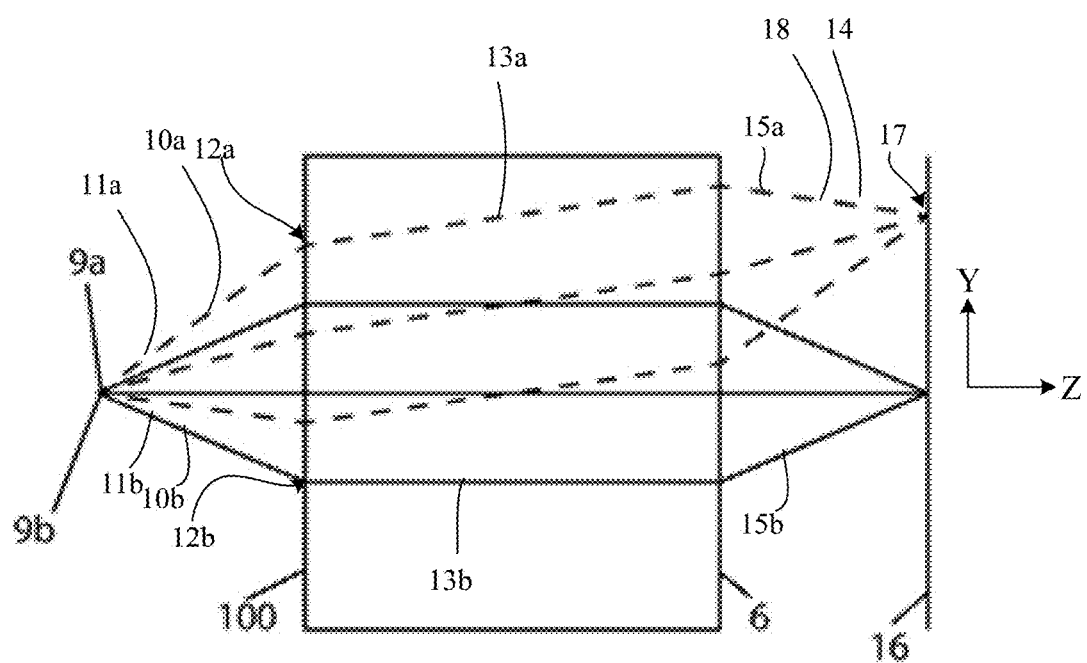
FIG. 8A shows propagation of primary light, intermediate light, and secondary light with respect to a lens and sample space.
Figure 8B:
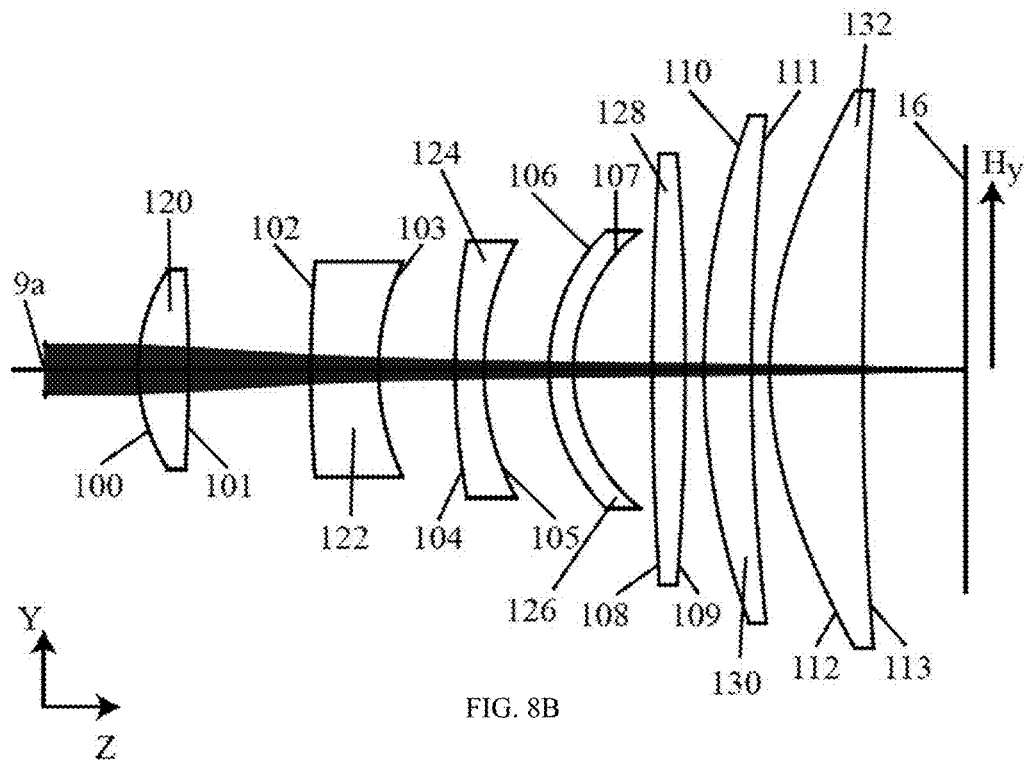
FIG. 8B shows propagation of primary light, intermediate light, and secondary light with respect to a lens and sample space.
Figure 8C:
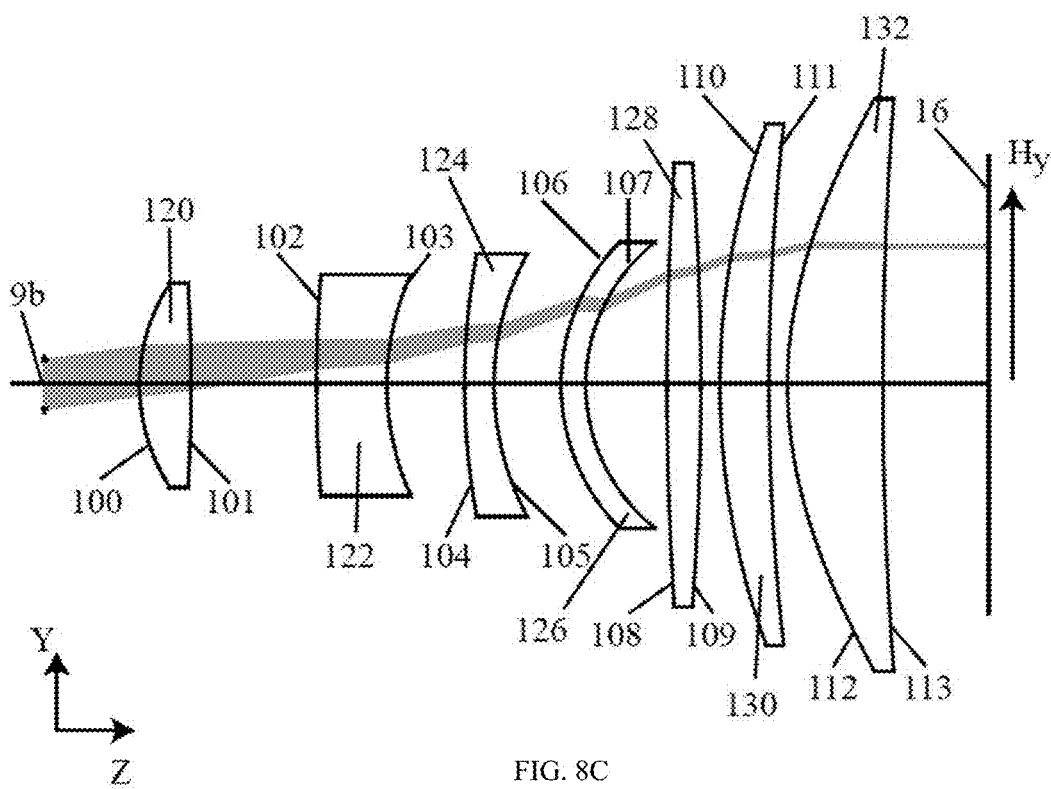
FIG. 8C shows propagation of primary light, intermediate light, and secondary light with respect to the lens and sample space shown in FIG. 8B.
Figure 8D:
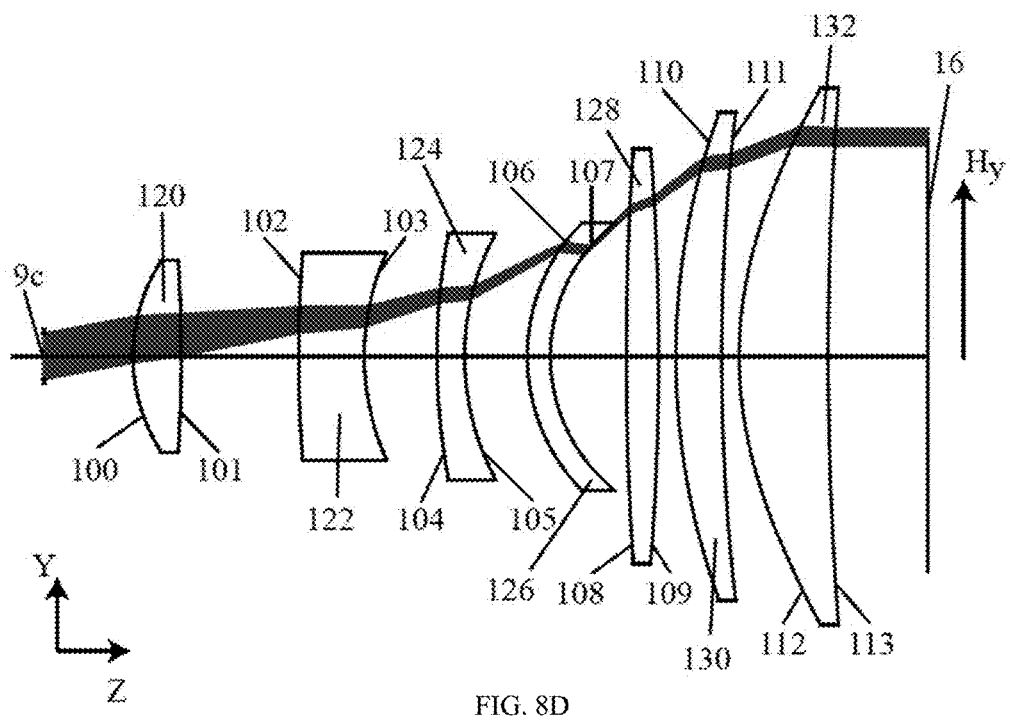
FIG. 8D shows propagation of primary light, intermediate light, and secondary light with respect to the lens and sample space shown in FIG. 8B.
Figure 8E:
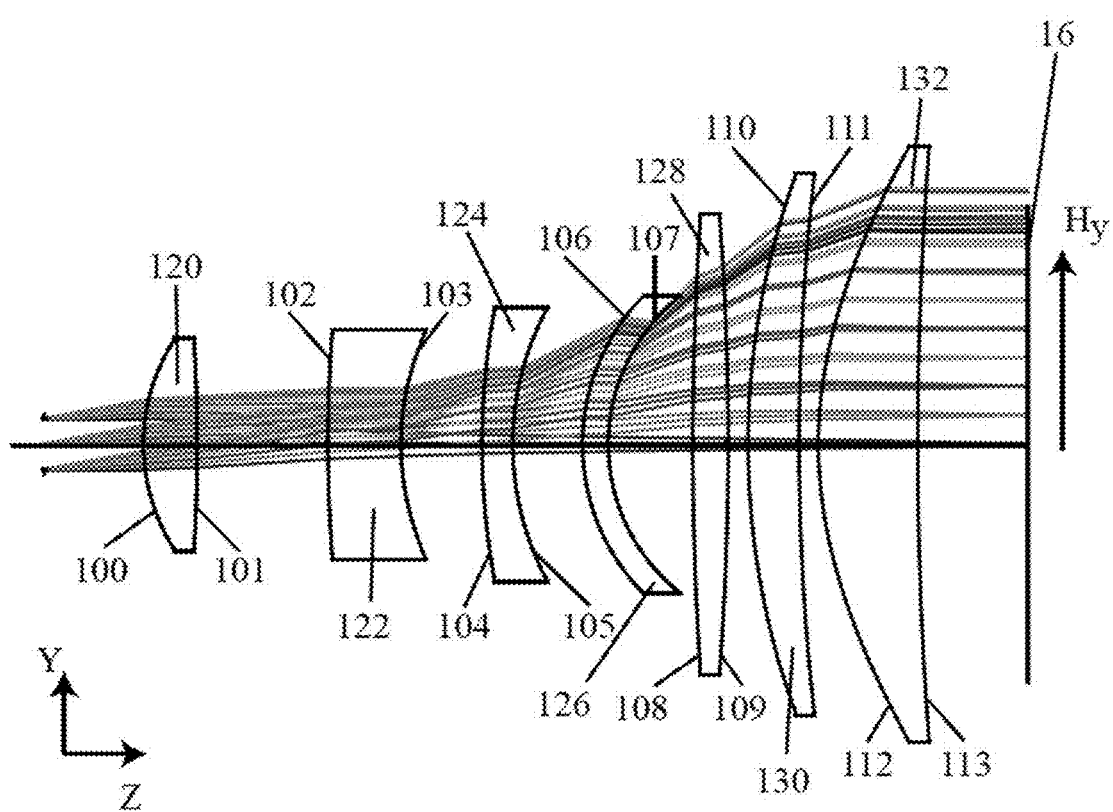
FIG. 8E shows temporally overlaid and spatially distinct propagation of primary light, intermediate light, and secondary light, including 12 half-angle points in the scan path with respect to a one-dimensional BPM optical transformer and sample space.

With reference to FIG. 8A, lens 6 is configured to transform initial propagation 12 (e.g., corresponding to nonlinear BPM scan) of primary light 10 into a substantially linearized final propagation 18 of secondary light 14 incident on sample space 16, e.g., by addition of a distortion aberration (e.g., see FIGS. 8F and 8G for an exemplary distortion) to initial propagation 12. That is, initial propagation 12 of primary light 10 is a nonlinear resonant scan incident on surface 100 of lens 6, and lens 6 produces secondary light 14 having final propagation 18 that is substantially linearized in space, time, or a combination thereof. As shown in FIG. 8A, first primary light 10a propagating from initial position 9a and characterized by a plurality of rays 11a is incident in a plurality of positions 12a at surface 100. Lens 6 optically transforms the plurality of rays 11a into a corresponding secondary ray 15a of secondary light 14 via intermediate rays 13a, wherein secondary rays 15a are incident at positions 17 on sample space 16. Further, second primary light 10b (which is different from first primary light 10a by an initial angle from light guide 22) propagating from initial position 9b and characterized by a plurality of rays 11b is incident in a plurality of positions 12b at surface 100. Lens 6 optically transforms each of the plurality of rays 11b into a corresponding secondary ray 15b of secondary light 14 via intermediate rays 13b, wherein secondary rays 15b are incident at positions 17 on sample space 16. In this manner, lens 6 transforms rays (11a, 11b) with different initial angles (9a, 9b) into a same secondary ray (15a or 15b) with position 17 incident at sample space 16.

An exemplary lens 6 is shown in FIGS. 8B-E. Here, lens 6 includes a plurality of lenses such as lens 120 (having surface 100 and surface 101), lens 122 (having surface 102 and surface 103), lens 124 (having surface 104 and surface 105), lens 126 (having surface 106 and surface 107), lens 128 (having surface 108 and surface 109), lens 130 (having surface 110 and surface 111), and lens 132 (having surface 112 and 113). Primary light (10a, 10b, 10c) from initial position (9a, 9b, 9c) (e.g., propagating from light guide 22 as collimated light) is incident at surface 100. Lens 6 (including lenses 120, 122, 124, 126, 128, 130, and 132) optically transforms primary light (10a, 10b, 10c) that has nonlinear initial propagation 12 to secondary light 14 having secondary rays 15 that are incident at positions 17 on sample space 16 at image height Hy. It is contemplated that lens 6 can have cylindrical symmetry about a Z-axis of the lens 6 shown in FIG. 8B. In some embodiments, lens 6 does not have cylindrical symmetry about the Z-axis. In other embodiments, lens 6 has a symmetry about Z-axis but not cylindrical symmetric.

An exemplary lens prescription for lenses 120, 122, 124, 126, 128, 130, and 132 of lens 6 shown in FIGS. 8B, 8C, 8D, and 8E is listed in Table 1 for a one-dimensional bounded periodic motion (BPM) optical transformer 2. Lens 6 can include a plurality of homogenous (i.e., a single index of refraction) lenses (e.g., lenses 120 to 132), as shown in in Table 1. In some embodiments, lenses (120, 122, 124, 126, 128, 130, 132) of lens 6 independently are heterogeneous.

Figure 8F:
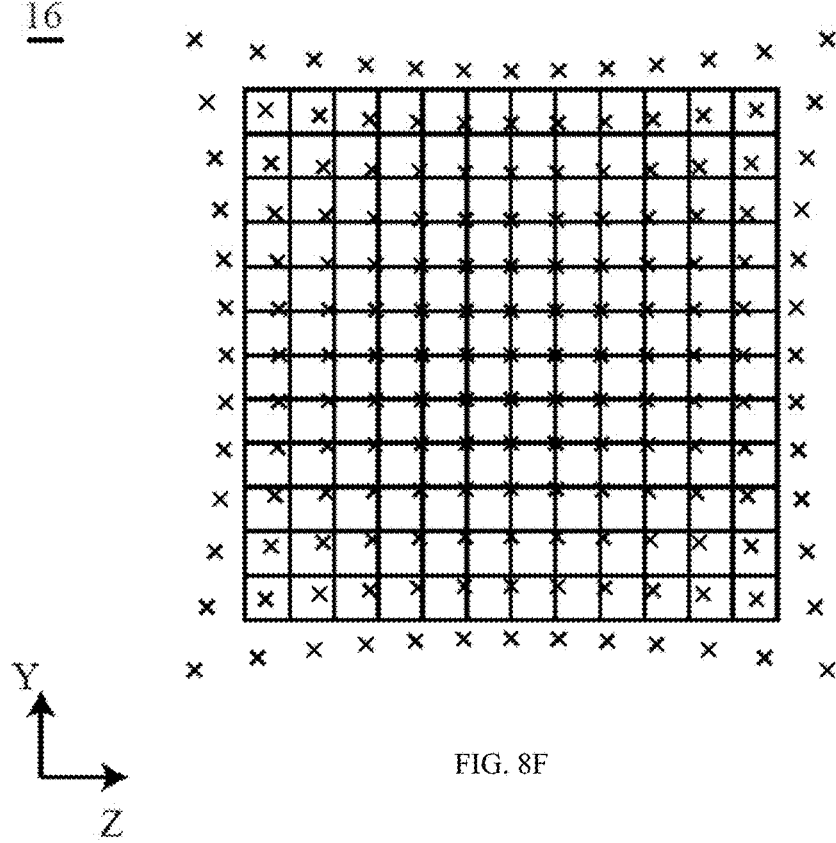
FIG. 8F shows distortion aberration, by the lens shown in FIG. 8B of primary light to produce secondary light.
Figure 8G:
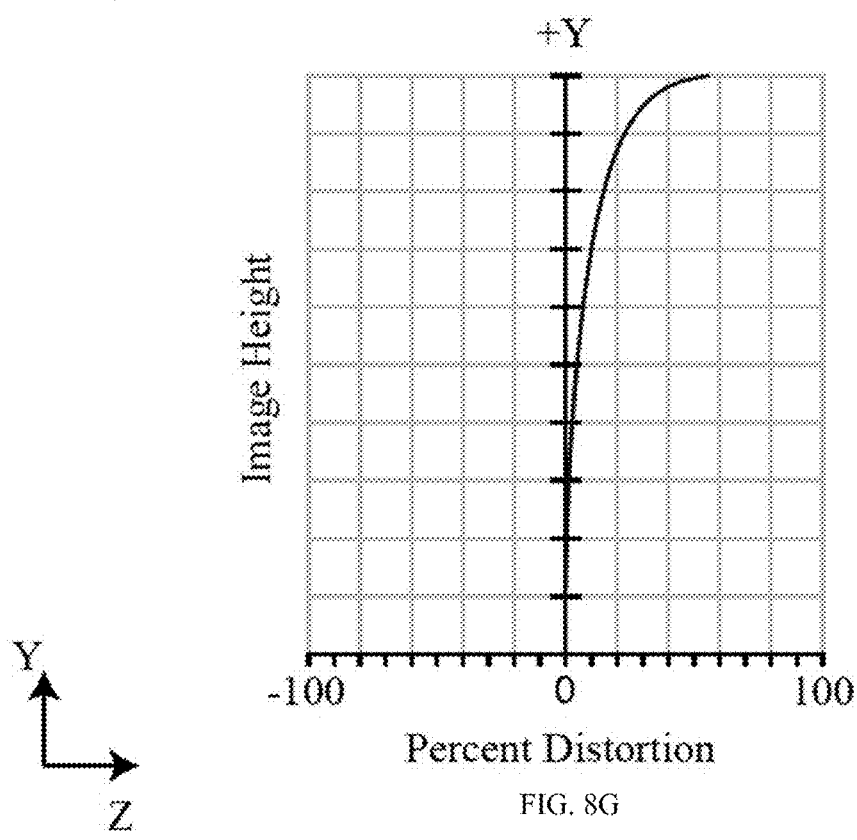
FIG. 8G shows a graph of image height versus percent distortion for the lens shown in FIG. 8B.
Figure 8H:
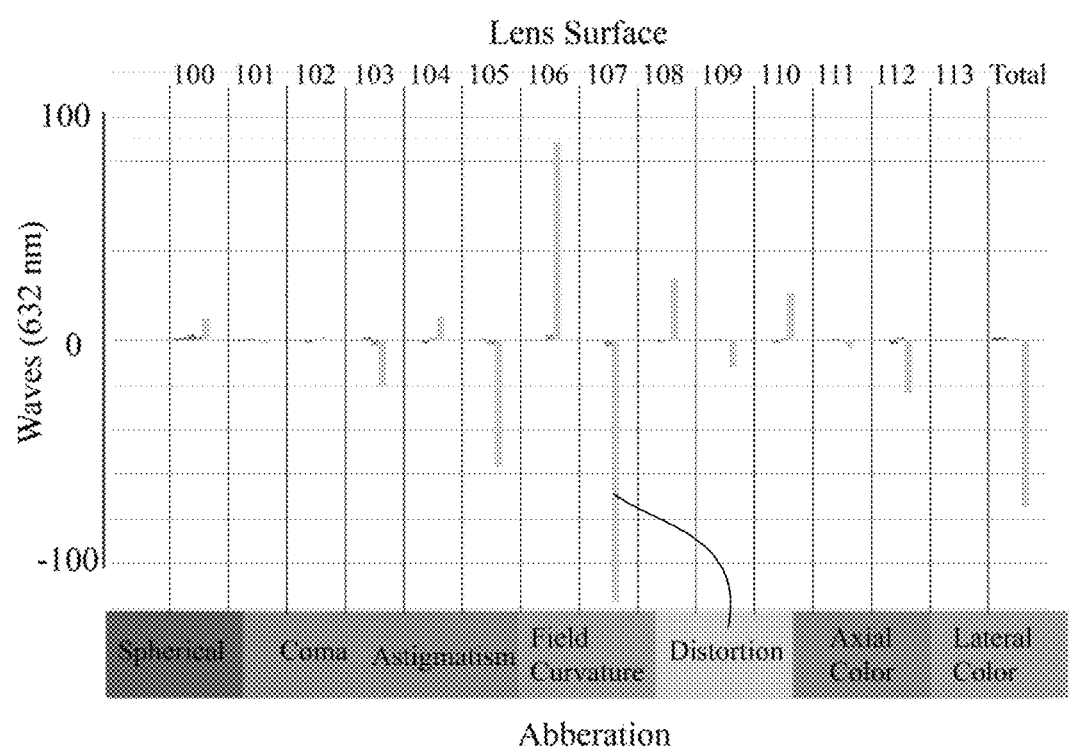
FIG. 8H shows aberrations for the lens shown in FIG. 8B.

According to an embodiment, lens 6 provides distortion aberration, such as a positive pincushion distortion shown in FIG. 8F, to initial propagation 12 having nonlinear BPM scan to transform initial propagation 12 to final propagation 18, which is a linearized scan based on the nonlinear scan of initial propagation 12. Here, with respect to sample 16, the distortion aberration created by lens 6 across the image plane field-of-view of sample space 16 is show graphically in FIG. 8G as image height versus percent distortion. Each of the lens 6 surfaces (e.g., 100 to 113) contributes aberrations to lens 6, as shown in FIG. 8H. The distortion aberration to linearize final propagation 18 is contributed by surfaces of lens 6 and results in residual total distortion to lens 6.

Figure 8I:
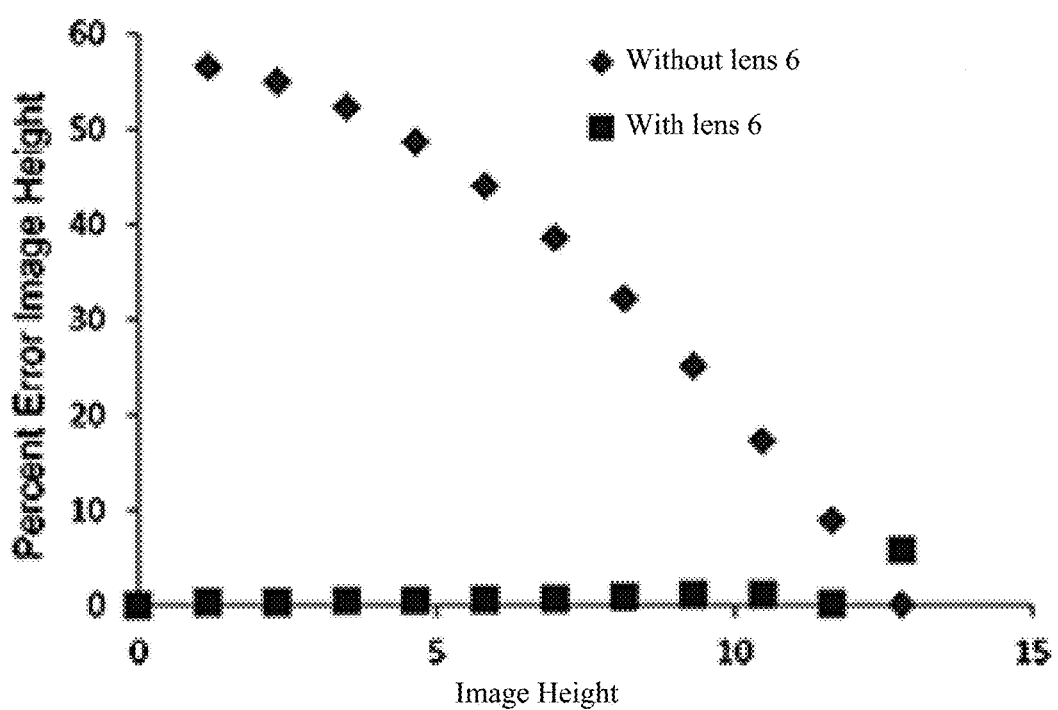
FIG. 8I shows a graph of percent error image height versus image height for the lens shown in FIG. 8B.

Further, lens 6 optically transforms the nonlinear BPM scan of initial propagation 12 to a substantially linear scan that is linear for all or a substantial portion of sample space 16, e.g., greater than or equal to 95% of sample space 16, as shown in FIG. 8I, which shows a graph of percent error in image height versus image height for configurations: a first configuration without lens 6 (shown as diamond shaped data points) interposed between optomechanical member 4 and sample space 16 and a second configuration with lens 6 (shown as square shaped data points) interposed between optomechanical member 4 and sample space 16.

An second exemplary lens 6 is shown in FIGS. 9A, 9B, 9C, 9D, and FIG. 9E. Here, optical transformer 2 is a two-dimensional BPM transformer configured to linearize a two-axes Lissajous scan. Here, lens 6 includes a plurality of lenses such as lens 220 (having surface 200 and surface 201), lens 222 (having surface 202 and surface 203), lens 224 (having surface 204 and surface 205), lens 226 (having surface 206 and surface 207), lens 228 (having surface 208 and surface 209), lens 230 (having surface 210 and surface 211), and lens 232 (having surface 212 and 213). Primary light 10 from initial position (9m, 9n, 9o, 9p) is incident at surface 100. Lens 6 (including lenses 220, 222, 224, 226, 228, 230, 232) optically transforms primary light 10 that has nonlinear initial propagation 12 to secondary light 14 having secondary rays 15 that are incident at positions 17 on sample space 16 at image height Hy. A lens prescription for lenses 220, 222, 224, 226, 228, 230, and 232 of lens 6 shown in FIG. 9A-9E is listed in Table 2. Lens 6 can include a plurality of homogenous (i.e., a single index of refraction) lenses (e.g., lenses 120 to 132), as shown in in Table 2. In some embodiments, lenses (220, 222, 224, 226, 228, 230, 232) of lens 6 independently are heterogeneous.

TABLE 1

| Surface | Radius | Thickness | Glass |
| --- | --- | --- | --- |
| 10 (STOP) | ∞ | 5.00 | |
| 100 | 9.87 | 2.69 | LITHOSIL-Q |
| 101 | −87.71 | 6.55 | |
| 102 | 74.46 | 3.66 | P-SF68 |
| 103 | 13.60 | 4.09 | |
| 104 | 37.40 | 1.54 | P-SF68 |
| 105 | 14.56 | 3.50 | |
| 106 | 40.74 | 1.29 | SF-66 |
| 107 | 9.59 | 4.23 | |
| 108 | 170.73 | 1.81 | P-LASF46-A |
| 109 | −152.82 | 1.00 | |
| 110 | 39.77 | 2.55 | P-SF68 |
| 111 | 120.97 | 0.97 | |
| 112 | 21.70* | 4.98 | SF11 |
| 113 | 198.01 | 5.55 | |
| 16 (image) | ∞ | — | |

*Surface 112 is a conic surface with a conic value of −2.36.

TABLE 2

| Surface | Radius | Thickness | Glass |
| --- | --- | --- | --- |
| 10 (STOP) | ∞ | 5.00 | |
| 200 | −30.88 | 5.06 | SSK3 |
| 201 | −7.88 | 8.85 | |
| 202 | −4.33 | 3.92 | N-LASF31 |
| 203 | −6.24 | 1.98 | |
| 204 | −6.88 | 2.01 | SF58 |
| 205 | −20.65 | 2.73 | |
| 206 | 21.22 | 8.19 | SF58 |
| 207 | 29.42 | 2.48 | |
| 208 | 17.94 | 6.86 | N-LASF44 |
| 209 | 48.92 | 8.47 | |
| 210 | −15.98 | 1.99 | LASF35 |
| 211 | −374.91 | 0.99 | |
| 212 | 9.84 | 10.01 | LAK16A |
| 213 | 98.38 | 11.68 | |
| 16 (image) | ∞ | — | |

Figure 9A:
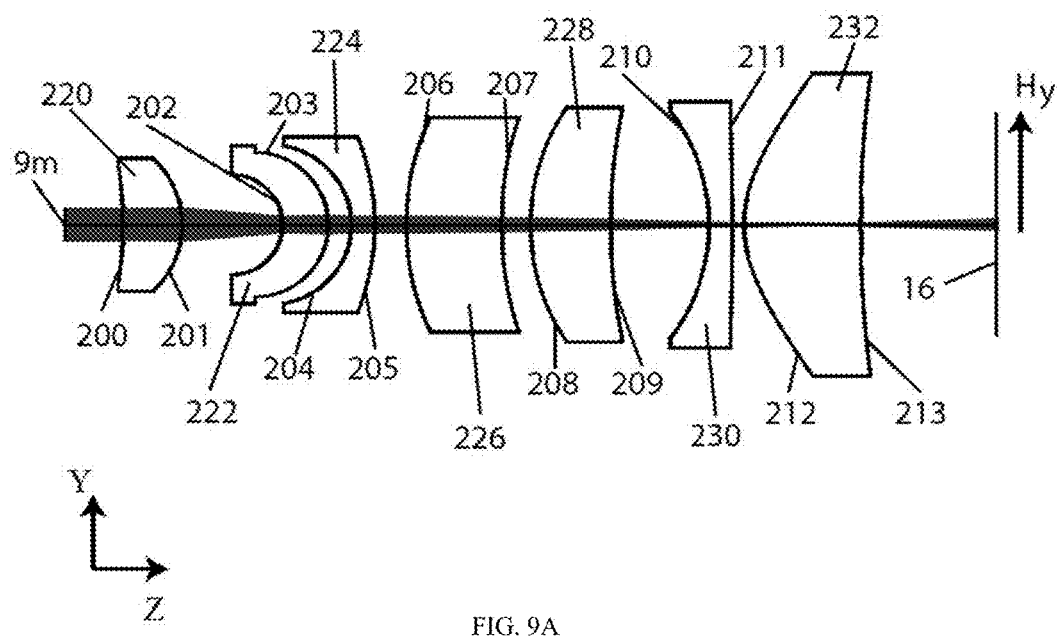
FIG. 9A shows propagation of primary light, intermediate light, and secondary light with respect to a lens and sample space.
Figure 9B:
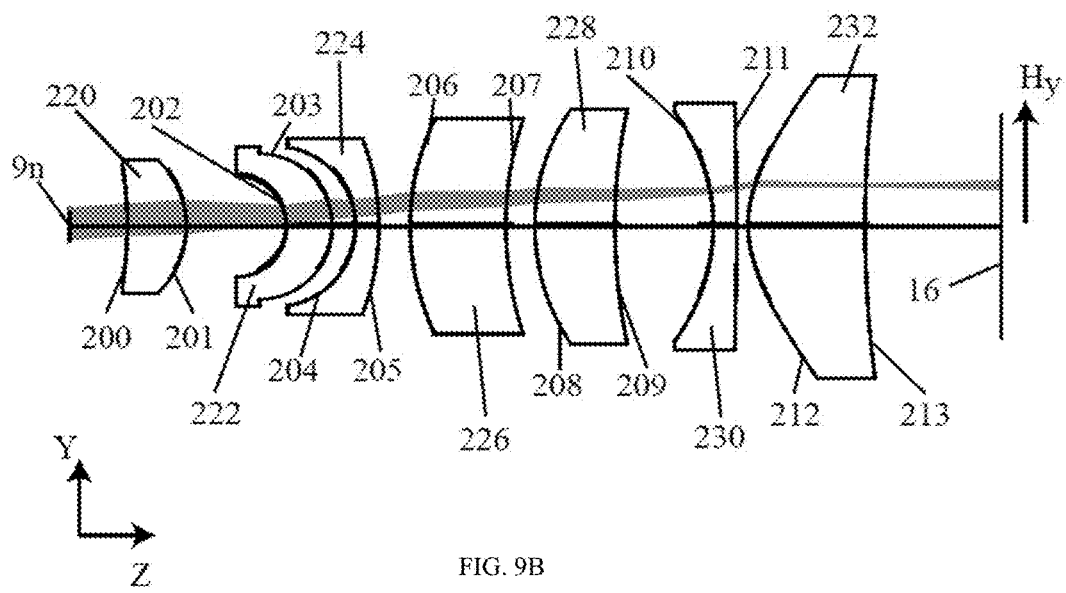
FIG. 9B shows propagation of primary light, intermediate light, and secondary light with respect to the lens and sample space shown in FIG. 9A.
Figure 9C:
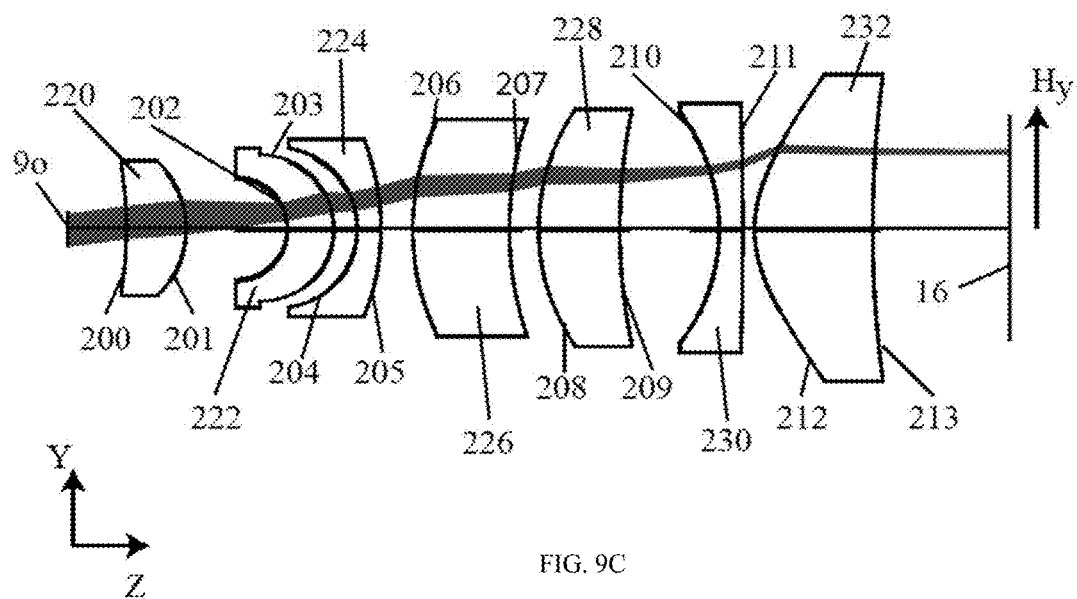
FIG. 9C shows propagation of primary light, intermediate light, and secondary light with respect to the lens and sample space shown in FIG. 9A.
Figure 9D:
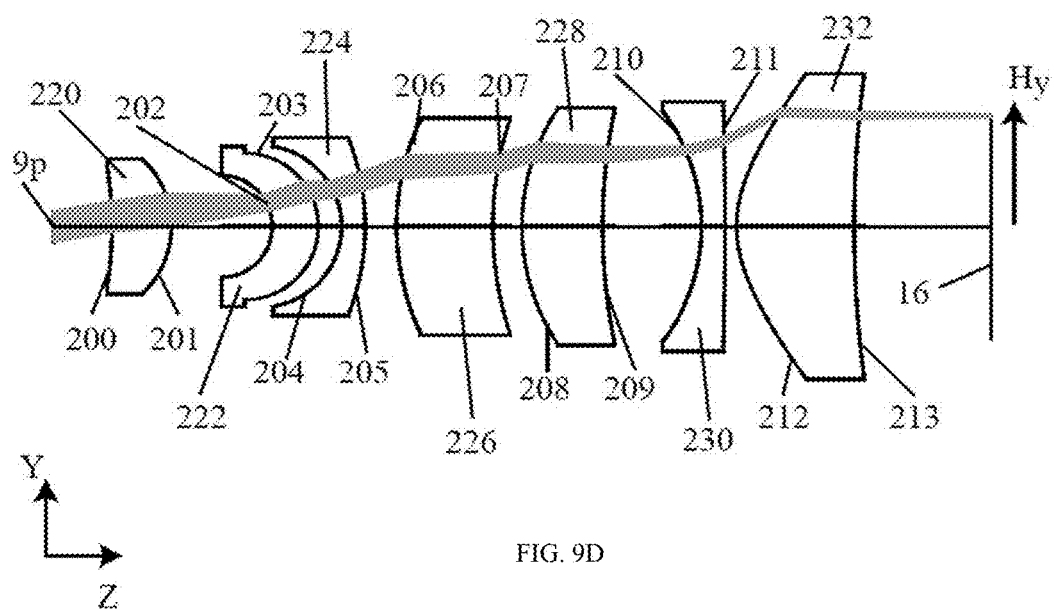
FIG. 9D shows propagation of primary light, intermediate light, and secondary light with respect to the lens and sample space shown in FIG. 8B.
Figure 9E:
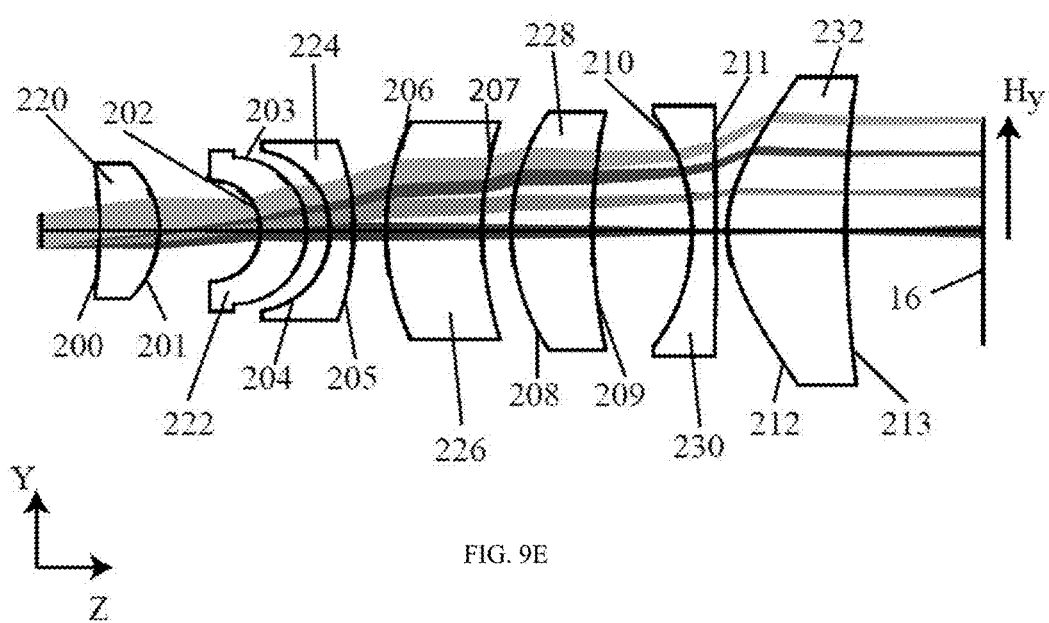
FIG. 9E shows temporally overlaid and spatially distinct propagation of primary light, intermediate light, and secondary light of 4 half-angle points in the scan path with respect to a two-dimensional BPM optical transformer capable of linearizing a Lissajous scan and sample space.
Figure 9H:
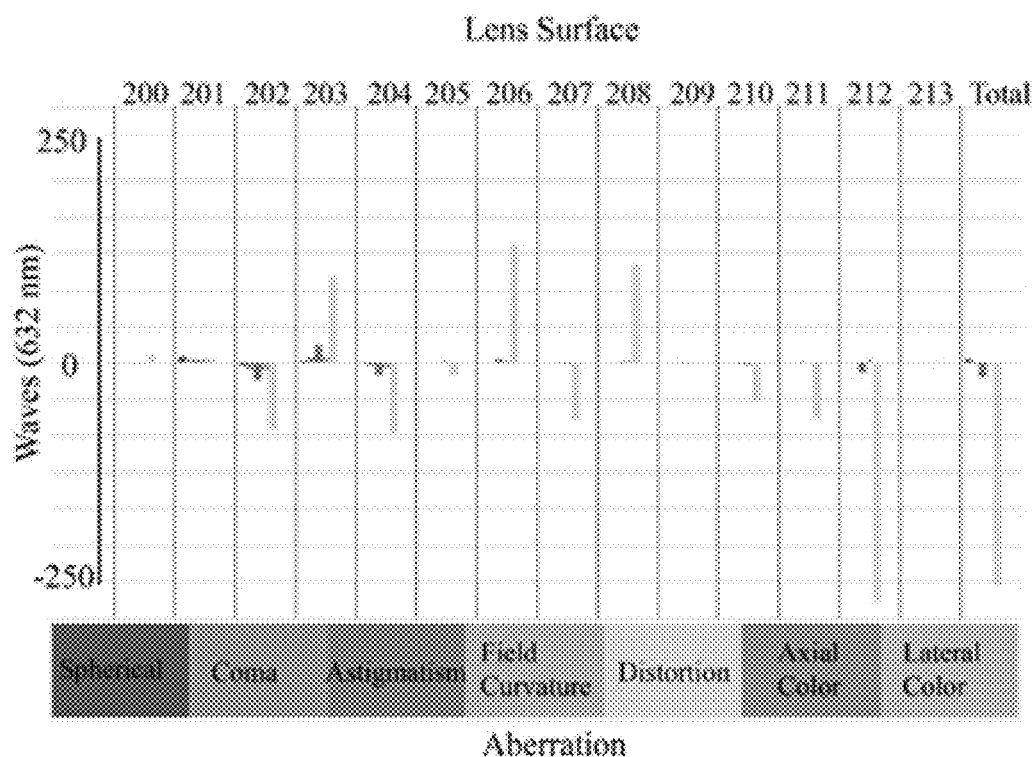
FIG. 9H shows aberrations for the lens shown in FIG. 9A.
Figure 9I:
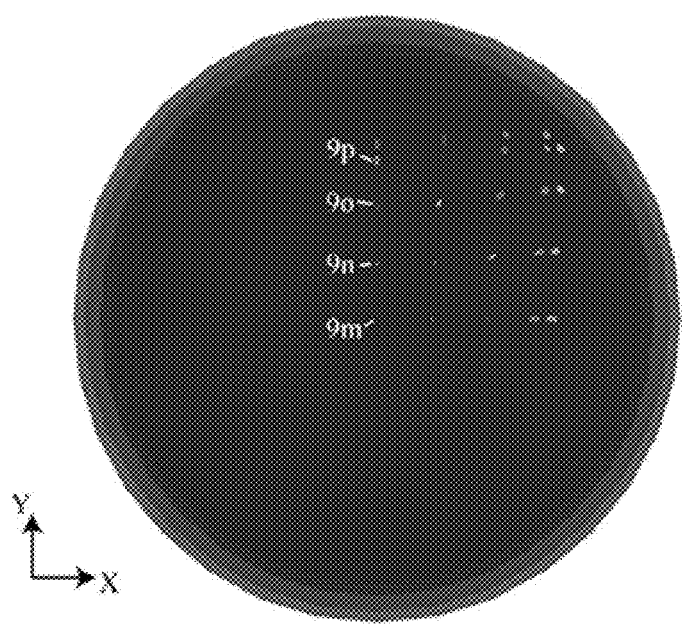
FIG. 9I shows point of final propagation of secondary light from the lens show in in FIG. 9A incident on an image plane of a sample space (not shown in FIG. 9A)
Figure 10A:
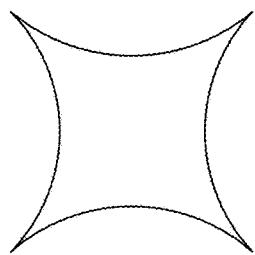
FIGS. 10A, 10B, 10C, 10D, 10E, 10F, 10G, 10H, 10I, 10J, 10K, 10L, 10M, 10N, and 10O show a pincushion distortion.
Figure 10B:
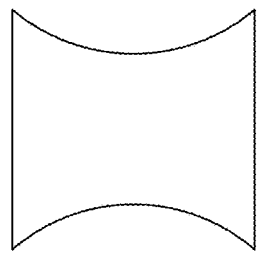
Figure 10C:
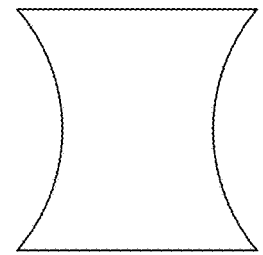
Figure 10D:
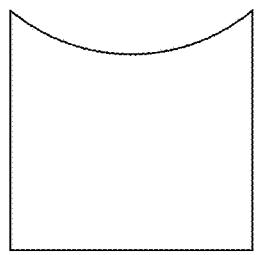
Figure 10E:
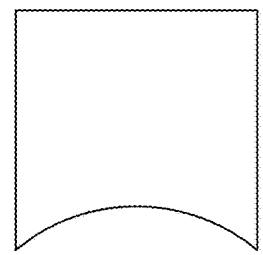
Figure 10F:
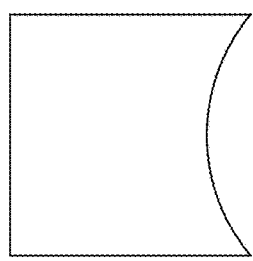
Figure 10G:
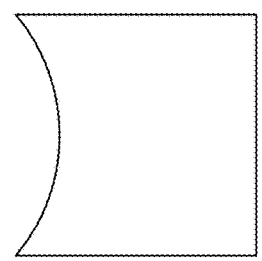
Figure 10H:
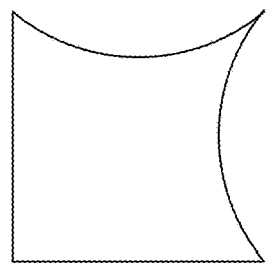
Figure 10I:
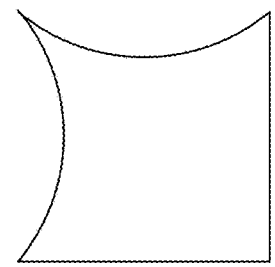
Figure 10J:
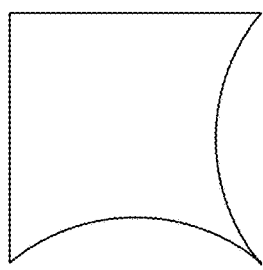
Figure 10K:
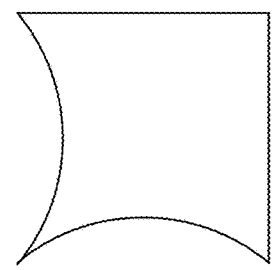
Figure 10L:
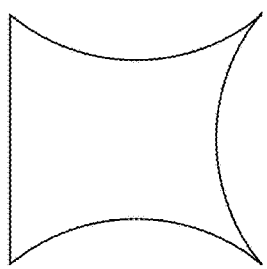
Figure 10M:
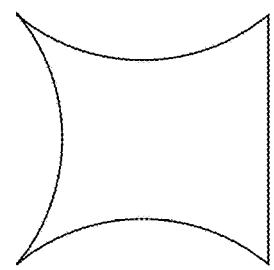
Figure 10N:
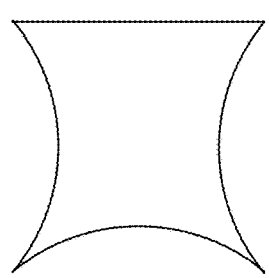
Figure 10O:
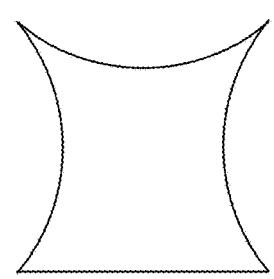
Figure 11A:
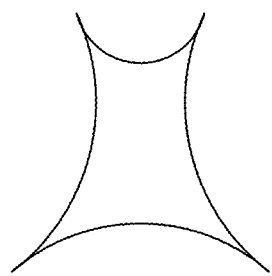
FIGS. 11A, 11B, 11C, 11D, 11E, 11F, 11G, 11H, 11I, 11J, 11K, 11L, 11M, 11N, and 11O show a hybrid distortion.
Figure 11B:
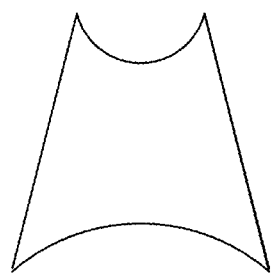
Figure 11C:
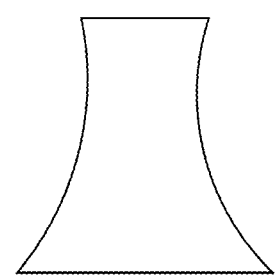
Figure 11D:
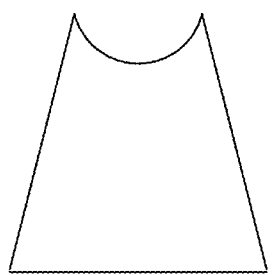
Figure 11E:
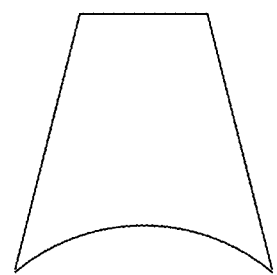
Figure 11F:
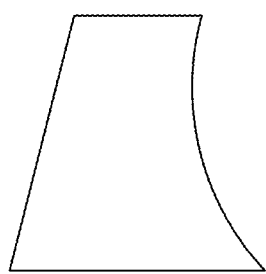
Figure 11G:
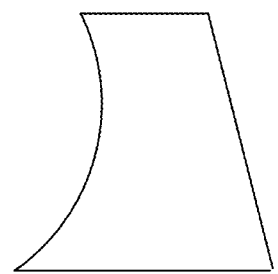
Figure 11H:
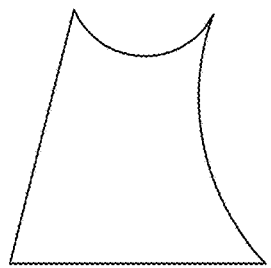
Figure 11I:
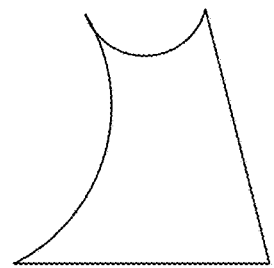
Figure 11J:
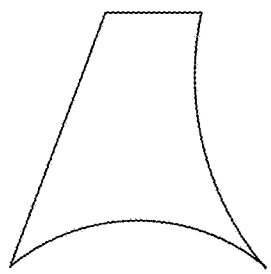
Figure 11K:
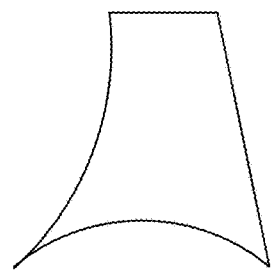
Figure 11L:
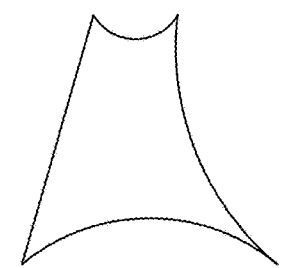
Figure 11M:
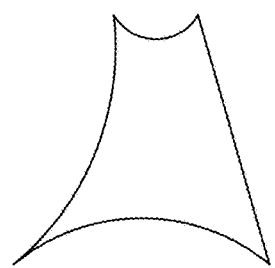
Figure 11N:
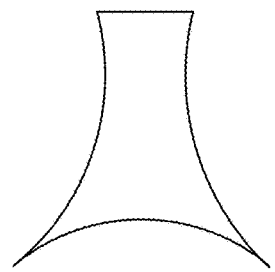
Figure 11O:
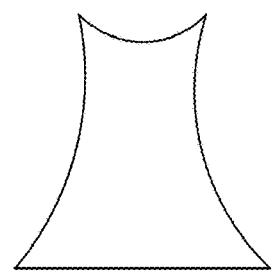
Figure 12A:
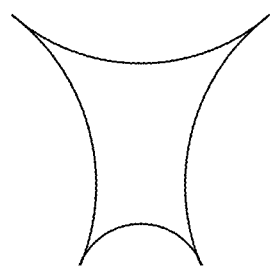
FIGS. 12A, 12B, 12C, 12D, 12E, 12F, 12G, 12H, 12I, 12J, 12K, 12L, 12M, 12N, and 12O show a hybrid distortion.
Figure 12B:
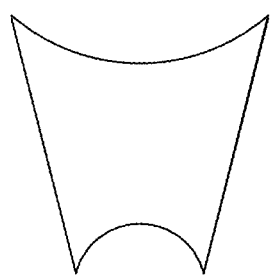
Figure 12C:
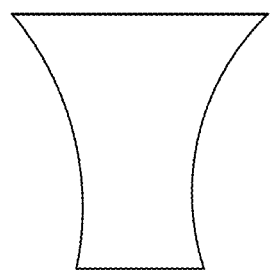
Figure 12D:
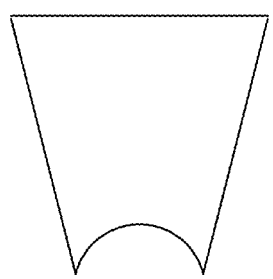
Figure 12E:
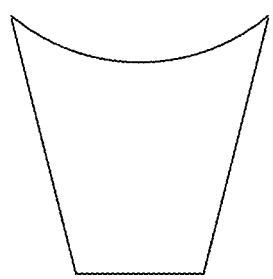
Figure 12F:
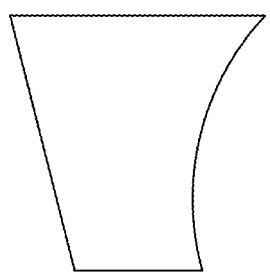
Figure 12G:
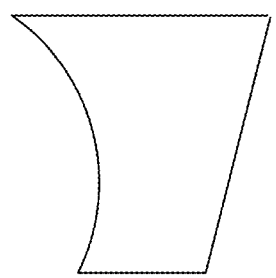
Figure 12H:
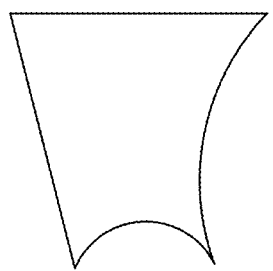
Figure 12I:
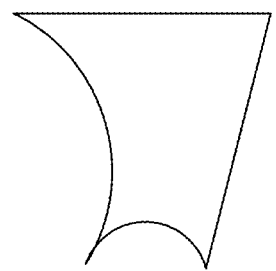
Figure 12J:
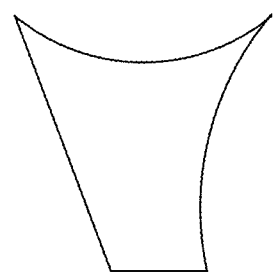
Figure 12K:
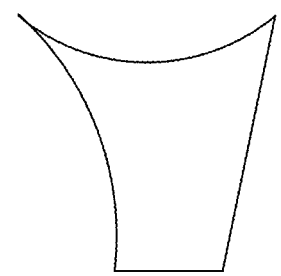
Figure 12L:
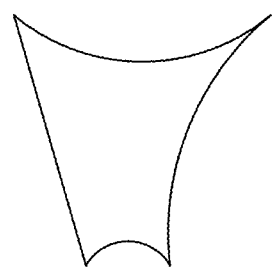
Figure 12M:
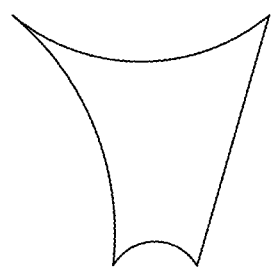
Figure 12N:
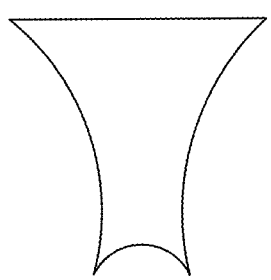
Figure 12O:
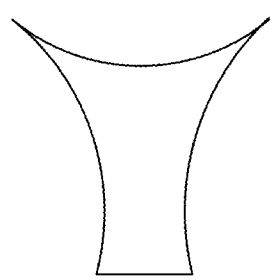
Figure 13A:
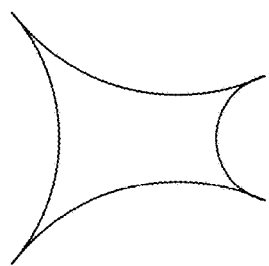
FIGS. 13A, 13B, 13C, 13D, 13E, 13F, 13G, 13H, 13I, 13J, 13K, 13L, 13M, 13N, and 13O show a hybrid distortion.
Figure 13B:
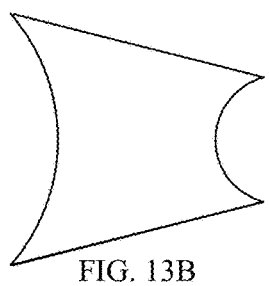
Figure 13C:
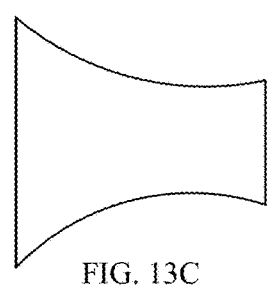
Figure 13D:
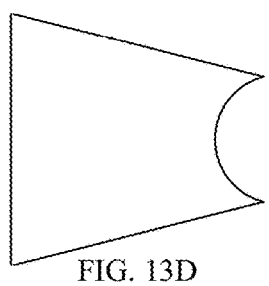
Figure 13E:
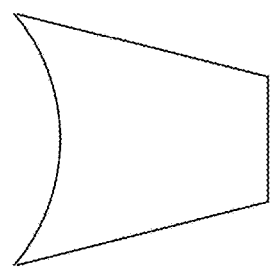
Figure 13F:
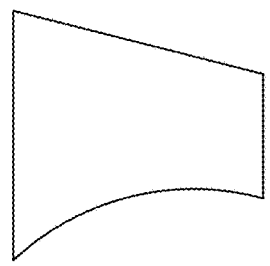
Figure 13G:
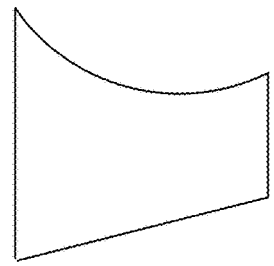
Figure 13H:
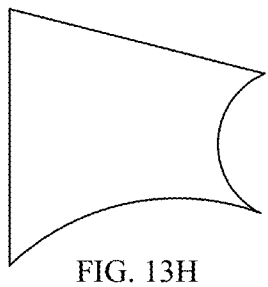
Figure 13I:
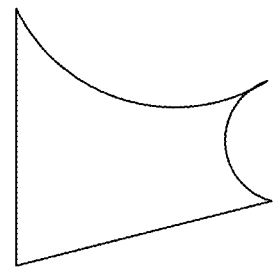
Figure 13J:
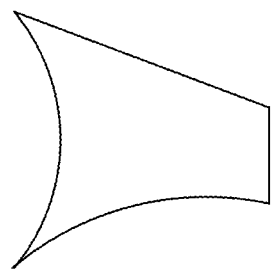
Figure 13K:
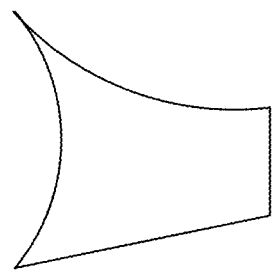
Figure 13L:
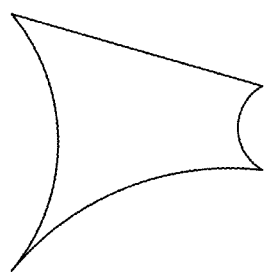
Figure 13M:
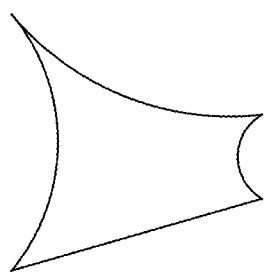
Figure 13N:
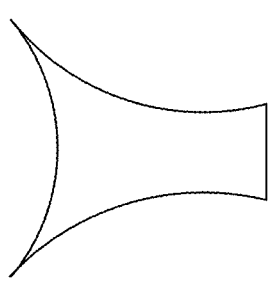
Figure 13O:
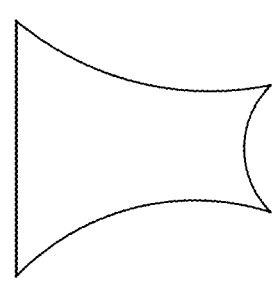
Figure 14A:
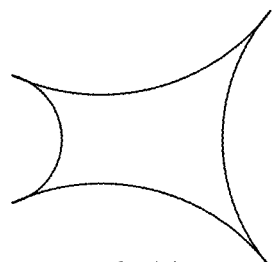
FIGS. 14A, 14B, 14C, 14D, 14E, 14F, 14G, 14H, 14I, 14J, 14K, 14L, 14M, 14N, and 14O show a hybrid distortion.
Figure 14B:
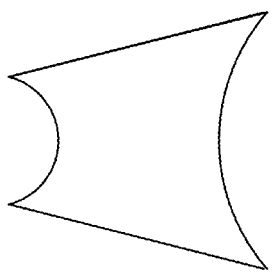
Figure 14C:
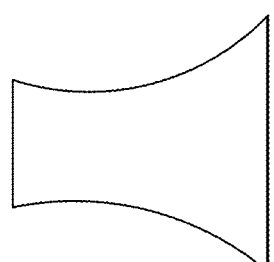
Figure 14D:
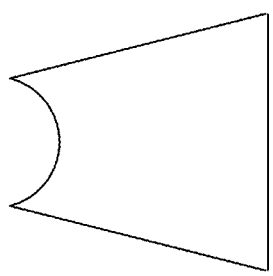
Figure 14E:
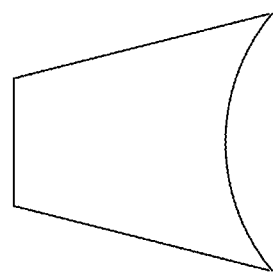
Figure 14F:
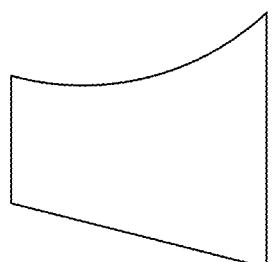
Figure 14G:
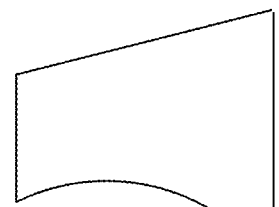
Figure 14H:
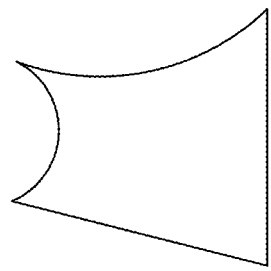
Figure 14I:
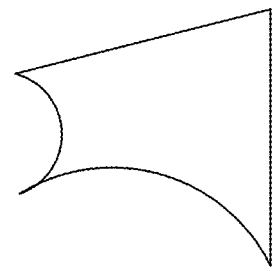
Figure 14J:
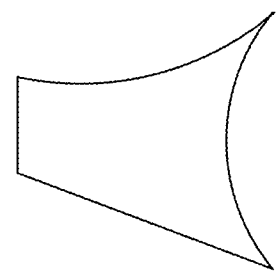
Figure 14K:
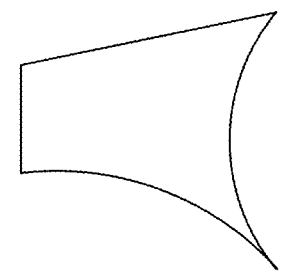
Figure 14L:
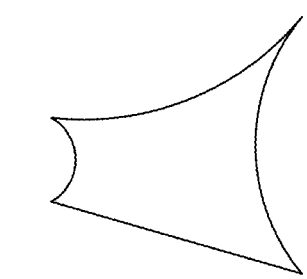
Figure 14M:
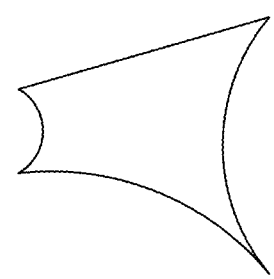
Figure 14N:
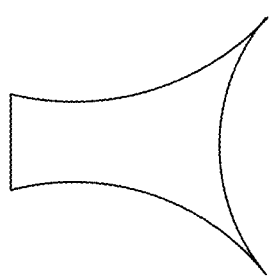
Figure 14O:
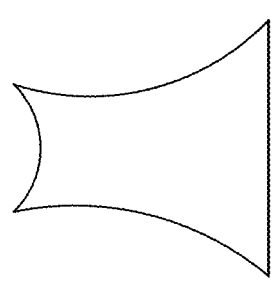

According to an embodiment, lens 6 provides distortion aberration, such as shown in the positive x, y axes portion of the image height field of view as shown in FIG. 9F, thus allowing initial propagation 12 having a two-axes nonlinear BPM scan to transform initial propagation 12 to final propagation 18, which is a linearized scan based on the nonlinear scan of initial propagation 12. Here, with respect to sample 16, the distortion aberration created by lens 6 across the image plane field-of-view of sample space 16 is show graphically in FIG. 9G as image height versus percent distortion. Each of the lens 6 surfaces (e.g., 100 to 113) contributes aberrations to lens 6, as shown in FIG. 9H. The distortion aberration that linearizes final propagation 18 is contributed by each lens 6 surface and results in significant residual total distortion to lens 6, as shown in FIG. 9H.

It is contemplated that lens 6 subjects primary light 10 to distortion to produce secondary light 14 having final propagation 18, which is linearized with respect to initial propagation 12, which is the nonlinear scan. Distortion includes a distortion effective to linearize initial propagation 12 to linearized final propagation 18. Accordingly, distortion can include a pincushion distortion, keystone distortion, or a combination thereof. In some embodiments, the distortion is a hybrid distortion between a superposition of a pincushion distortion and keystone distortion.

Exemplary pincushion distortions are shown in FIG. 10 and include a biaxial symmetric pincushion distortion (FIG. 10A, e.g., a positive pincushion distortion), uniaxial symmetric pincushion distortion (FIGS. 10B and 10C), uniaxial asymmetric pincushion distortion (FIGS. 10D, 10E, 10F, and 10G), biaxial asymmetric pincushion distortion (FIGS. 10H, 10I, 10J, 10K, 10L, 10M, 10N, and 10O), and the like.

Exemplary hybrid distortions are proper hybrid distortions shown in FIG. 11 and include a biaxial symmetric hybrid distortion (FIG. 11A, e.g., a positive pincushion distortion), uniaxial symmetric hybrid distortion (FIGS. 11B and 11C), uniaxial asymmetric hybrid distortion (FIGS. 11D, 11E, 11F, and 11G), biaxial asymmetric hybrid distortion (FIGS. 11H, 11I, 11J, 11K, 11L, 11M, 11N, and 11O), and the like.

Further exemplary hybrid distortions are inverted hybrid distortions shown in FIG. 12 and include a biaxial symmetric hybrid distortion (FIG. 12A, e.g., a positive pincushion distortion), uniaxial symmetric hybrid distortion (FIGS. 12B and 12C), uniaxial asymmetric hybrid distortion (FIGS. 12D, 12E, 12F, and 12G), biaxial asymmetric hybrid distortion (FIGS. 12H, 12I, 12J, 12K, 12L, 12M, 12N, and 12O), and the like.

Additional exemplary hybrid distortions are dextro-hybrid distortions shown in FIG. 13 and include a biaxial symmetric hybrid distortion (FIG. 13A, e.g., a positive pincushion distortion), uniaxial symmetric hybrid distortion (FIGS. 13B and 13C), uniaxial asymmetric hybrid distortion (FIGS. 13D, 13E, 13F, and 13G), biaxial asymmetric hybrid distortion (FIGS. 13H, 13I, 13J, 13K, 13L, 13M, 13N, and 13O), and the like.

Further additional exemplary hybrid distortions are levo-hybrid distortions shown in FIG. 14 and include a biaxial symmetric hybrid distortion (FIG. 14A, e.g., a positive pincushion distortion), uniaxial symmetric hybrid distortion (FIGS. 14B and 14C), uniaxial asymmetric hybrid distortion (FIGS. 14D, 14E, 14F, and 14G), biaxial asymmetric hybrid distortion (FIGS. 14H, 14I, 14J, 14K, 14L, 14M, 14N, and 14O), and the like.

Figure 15:
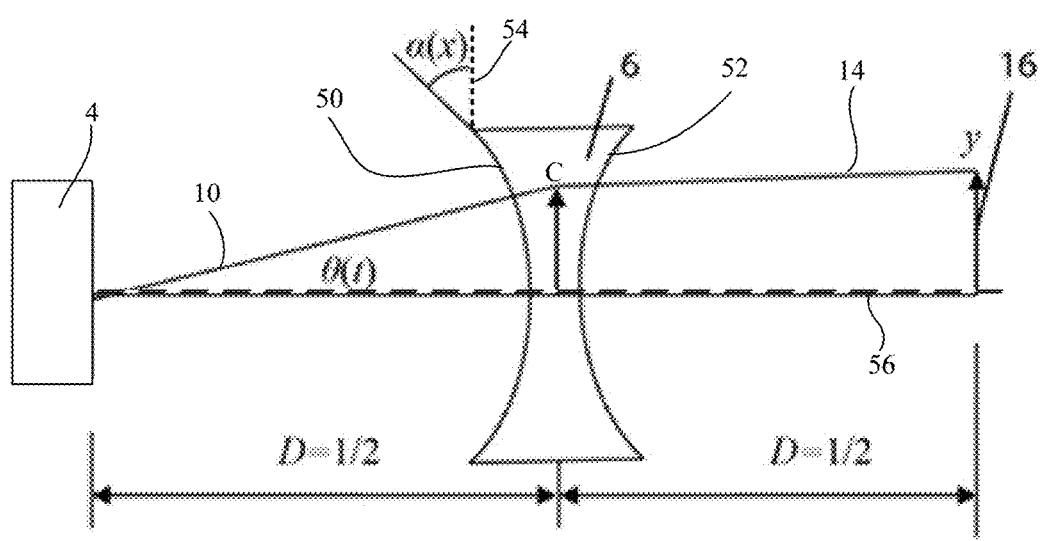
FIG. 15 shows a lens.

With reference to FIG. 15, an embodiment of lens 6 includes a shape of first surface 100 and surface 120 to refract light such that lens 6 is configured to cancel a cubic nonlinearity (e.g., a second term on a right-hand side of formula 3, namely $t^3/3!$) of initial propagation 12 produced by such motion of light guide 22 of optomechanical member 4. As shown in FIG. 15, lens 6 can have a biconcave shape that includes first surface 100 to receive primary light 10 and second 120 from which secondary light 14 propagates, wherein first surface 100 is arranged to be convex with respect to second surface 120, and first surface 100 is arranged to be convex with respect to second surface 120. That is, first surface 100 is concave with respect to primary light 10 incident on first surface 100, and second surface 120 is concave with respect to secondary light 14 that propagates away from second surface 120. First surface 100 and second surface 120 can have same or different shape. In an embodiment, first surface 100 and second surface 120 independently are characterized by angular function $\alpha(x)$, where $\alpha$ is an angle from a vertical at a displacement x from axis 54 of lens 6. Additionally, angle $\theta$ (where $\theta(t)=A\sin(t)$) is an angular displacement with amplitude, A, of primary light 10 of resonant optomechanical member 4 from central axis 56. A source of primary light 10 (e.g., optomechanical member 4) is located at a selected distance D, e.g., D=1/2 units, from centerline C of lens 6. For a thin lens approximation, a displacement y from central axis 56 of secondary light 14 on sample space 16 (located at D, e.g., D=1/2 units) is provided by formula 4 as $$y = \theta - (n-1)\alpha \qquad (4),$$

where n is a refractive index of lens 6. A cubic term in a series expansion of $\theta(t)$ is canceled as provided in formula 5 as follows:

$$\alpha(x) = \frac{A}{6(n-1)}\left[\sin^{-1}\left(\frac{x}{A}\right)\right]^3, \qquad (5)$$

wherein $-A \leq x \leq A$. Here, A is the angular amplitude.

A shape of first surface 100 or second surface 120 of lens 6 can be determined by integrating $\alpha(x)$ with respect to x to obtain a lens profile h(x), where h(0)=0.

Similarly, higher-order terms in the series expansion of $\theta(t)$ can be eliminated by an appropriate shape for lens 6. Lens 6 can be constructed using a plurality of homogenous (i.e., a single index of refraction) lenses or can include a combination of heterogeneous lenses.

In an embodiment, lens 6 includes a plurality of lenses that include a glass, plastic, meta material, and the like that independently have an index of refraction that is different from each other. According to an embodiment, the plurality of lenses of lens 6 is a gradient index (GRIN) lens to optically transform primary light 10 with initial propagation 12 to secondary light 14 with final propagation 18.

In an embodiment, a process for making optical transformer 2 includes providing optomechanical member 4 configured to provide primary light 10 having initial propagation 12 that is a nonlinear scan; and disposing lens 6 proximate to and in optical communication with optomechanical member 4 to receive primary light 10 from optomechanical member 4 and to optically transform primary light 10 to secondary light 14 to produce optical transformer 2, wherein secondary light 14 has final propagation 18 that is linear scan, based on linearization of initial propagation 12.

According to an embodiment, a process for optically transforming a nonlinear scan includes: receiving incident light 8 by optical transformer 2 that includes: optomechanical member 4 configured to receive incident light 8; and lens 6 in optical communication with optomechanical member 4; producing, by optomechanical member 4, primary light 10 from incident light 8, primary light 10 including initial propagation 12 that includes a nonlinear scan; communicating primary light 10 from optomechanical member 4 to lens 6; and producing, by lens 6, secondary light 14 from primary light 10 to optically transform the nonlinear scan, secondary light 14 including final propagation 18 that includes a linear scan, based on optically linearizing initial propagation 12. Here, producing secondary light 14 includes subjecting primary light 10 to a pincushion distortion by lens 6.

Optical transformer 2 has numerous advantages and benefits. Beneficially, optical transformer 2 is configured to linearize the nonlinear scan of initial propagation 12 from incident light 8 by lens 6 system that subjects initial propagation 12 to a positive pincushion distortion to produce final propagation 18 having the linear scan. Additionally, optical transformer 2 provides a scalable size, large optomechanical field-of-view, and high frame rate image acquisition and display. Advantageously, final propagation 18 is linear across the FOV overcoming variation in a pixel dwell time or displacement that would be caused by initial propagation 12 in an absence of lens 6.

Moreover, optical transformer 2 is useful in a plurality of optical environments including inclusion of optical transformer 2 in endoscopy, optical microscopy, light detection and ranging (e.g., LIDAR), light-based machining and fabrication processes, light scanning display systems, and the like.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. An optical transformer comprising:
   an optomechanical member configured:
     to receive incident light; and
     to produce primary light from the incident light comprising an initial propagation that comprises a nonlinear scan; and
   a lens configured:
     to receive the primary light from the optomechanical member;
     to linearize the nonlinear scan; and
     to produce secondary light comprising a final propagation that comprises a linear scan, such that the optical transformer is configured to transform the nonlinear scan of the primary light to the linear scan of the secondary light.

2. The optical transformer of claim 1, further comprising a source to provide the incident light.

3. The optical transformer of claim 1, wherein the optomechanical member comprises:
   a mount; and
   a light guide in mechanical communication with the mount.

4. The optical transformer of claim 3,
   wherein the light guide comprises a mirror to reflect the incident light to produce the primary light, and
   the mount comprises a rotary member in mechanical communication with the mirror to produce the initial propagation of the primary light.

5. The optical transformer of claim 3, wherein the optomechanical member further comprises an actuator in mechanical communication with the light guide to displace the light guide from a first position to a second position.

6. The optical transformer of claim 3, wherein the light guide comprises a transmission region; and
   a cladding proximate to the transmission region to direct the primary light along a propagation axis of the transmission region.

7. The optical transformer of claim 6, wherein the transmission region comprises a terminus proximate to the lens, a shape of the terminus being flat, convex, ridged, or a combination comprising at least one of the foregoing shapes.

8. The optical transformer of claim 6, wherein the light guide comprises a plurality of transmission regions and a plurality of claddings such that the light guide is configured to multiplex production of the primary light.

9. The optical transformer of claim 5, wherein the optomechanical member further comprises a controller in electrical communication to the actuator and configured to produce an electrical signal to control actuation of the actuator.

10. The optical transformer of claim 1, wherein the initial propagation comprises a mixed resonance pattern, Lissajous pattern, spiral pattern, or a combination comprising at least one of the foregoing patterns.

11. The optical transformer of claim 1, wherein the lens comprises a plurality of lenses configured to distort the primary light through a pincushion distortion of the primary light.

12. The optical transformer of claim 1, wherein the lens comprises a plurality of lenses configured to distort the primary light through a hybrid distortion of the primary light comprising a keystone-pincushion distortion.

13. The optical transformer of claim 1, wherein the lens comprises a biconcave lens.

14. The optical transformer of claim 1, wherein the optomechanical member is configured to resonantly produce the primary light.

15. The optical transformer of claim 14, wherein the nonlinear scan of the primary light is temporally nonlinear, spatially nonlinear, or a combination comprising at least one of the foregoing nonlinearities.

16. The optical transformer of claim 1, wherein the lens is configured to optically transform the initial propagation to the final propagation by cancelling a cubic nonlinearity in the initial propagation.

17. A process for making an optical transformer, the process comprising:
 providing an optomechanical member configured to provide a primary light that comprises an initial propagation that comprises a nonlinear scan; and
 disposing a lens proximate to and in optical communication with the optomechanical member to receive the primary light from the optomechanical member and to optically transform the primary light to a secondary light to produce the optical transformer,
 wherein the secondary light comprises a final propagation that comprises a linear scan, based on optical linearization of the initial propagation.

18. The process of claim 17, wherein the lens comprises a plurality of lenses configured to provide a pincushion distortion to the primary light.

19. A process for optically transforming a nonlinear scan, the process comprising:
 receiving an incident light by an optical transformer that comprises:
  an optomechanical member configured to receive the incident light; and
  a lens in optical communication with the optomechanical member;
 producing, by the optomechanical member, a primary light from the incident light, the primary light comprising an initial propagation that comprises a nonlinear scan;
 communicating the primary light from the optomechanical member to the lens; and
 producing, by the lens, a secondary light from the primary light to optically transform the nonlinear scan, the secondary light comprising a final propagation that comprises a linear scan, based on optically linearizing the initial propagation.

20. The process of claim 19, wherein producing the secondary light comprises subjecting the primary light to a pincushion distortion by the lens.

* * * * *